(12) United States Patent
Miyazaki

(10) Patent No.: US 8,804,141 B2
(45) Date of Patent: Aug. 12, 2014

(54) CHARACTER OUTPUT DEVICE, CHARACTER OUTPUT METHOD AND COMPUTER READABLE MEDIUM

(75) Inventor: Masaya Miyazaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 865 days.

(21) Appl. No.: 12/509,744

(22) Filed: Jul. 27, 2009

(65) Prior Publication Data

US 2010/0231953 A1  Sep. 16, 2010

(30) Foreign Application Priority Data

Mar. 10, 2009  (JP) ................................. 2009-055902

(51) Int. Cl.
G06K 15/02 (2006.01)

(52) U.S. Cl.
USPC ............ 358/1.11; 358/1.1; 715/256; 382/229

(58) Field of Classification Search
USPC .................................. 358/1.1, 1.9, 1.11, 462
See application file for complete search history.

(56) References Cited

U.S. PATENT DOCUMENTS

| | | | |
|---|---|---|---|
| 5,508,810 A | 4/1996 | Sato | |
| 6,295,385 B1 * | 9/2001 | Takaoka et al. | 382/289 |
| 6,336,011 B1 | 1/2002 | Sumio et al. | |
| 6,504,540 B1 * | 1/2003 | Nakatsuka | 345/619 |
| 7,450,268 B2 * | 11/2008 | Martinez et al. | 358/1.9 |
| 8,139,082 B2 * | 3/2012 | Kitora | 345/619 |
| 2003/0202191 A1 * | 10/2003 | Osawa et al. | 358/1.1 |
| 2007/0081179 A1 * | 4/2007 | Nishida | 358/1.11 |

FOREIGN PATENT DOCUMENTS

| | | |
|---|---|---|
| JP | A-05-110814 | 4/1993 |
| JP | A-08-274980 | 10/1996 |
| JP | A-2001-027865 | 1/2001 |
| JP | A-2004-130588 | 4/2004 |
| JP | A-2006-014247 | 1/2006 |
| JP | A-2006-035529 | 2/2006 |
| JP | A-2006-115309 | 4/2006 |
| JP | B2-3840257 | 11/2006 |
| JP | A-2008-179112 | 8/2008 |

OTHER PUBLICATIONS

Japanese Office Action in Japanese Patent Application No. 2009-055902; dated Jan. 17, 2011 (with English-language translation).

* cited by examiner

Primary Examiner — Mark Zimmerman
Assistant Examiner — Lawrence Wills
(74) Attorney, Agent, or Firm — Oliff PLC

(57) ABSTRACT

A character output device includes: a character direction specification unit that specifies a drawing direction of characters for each processing-target region of a processing-target page; a character rotation determination unit that determines as to whether the processing-target page rotates or not based on a relation between the specified drawing direction and a direction of an output medium; and an output unit that performs an output processing based on the determination by the character rotation determination unit.

9 Claims, 30 Drawing Sheets

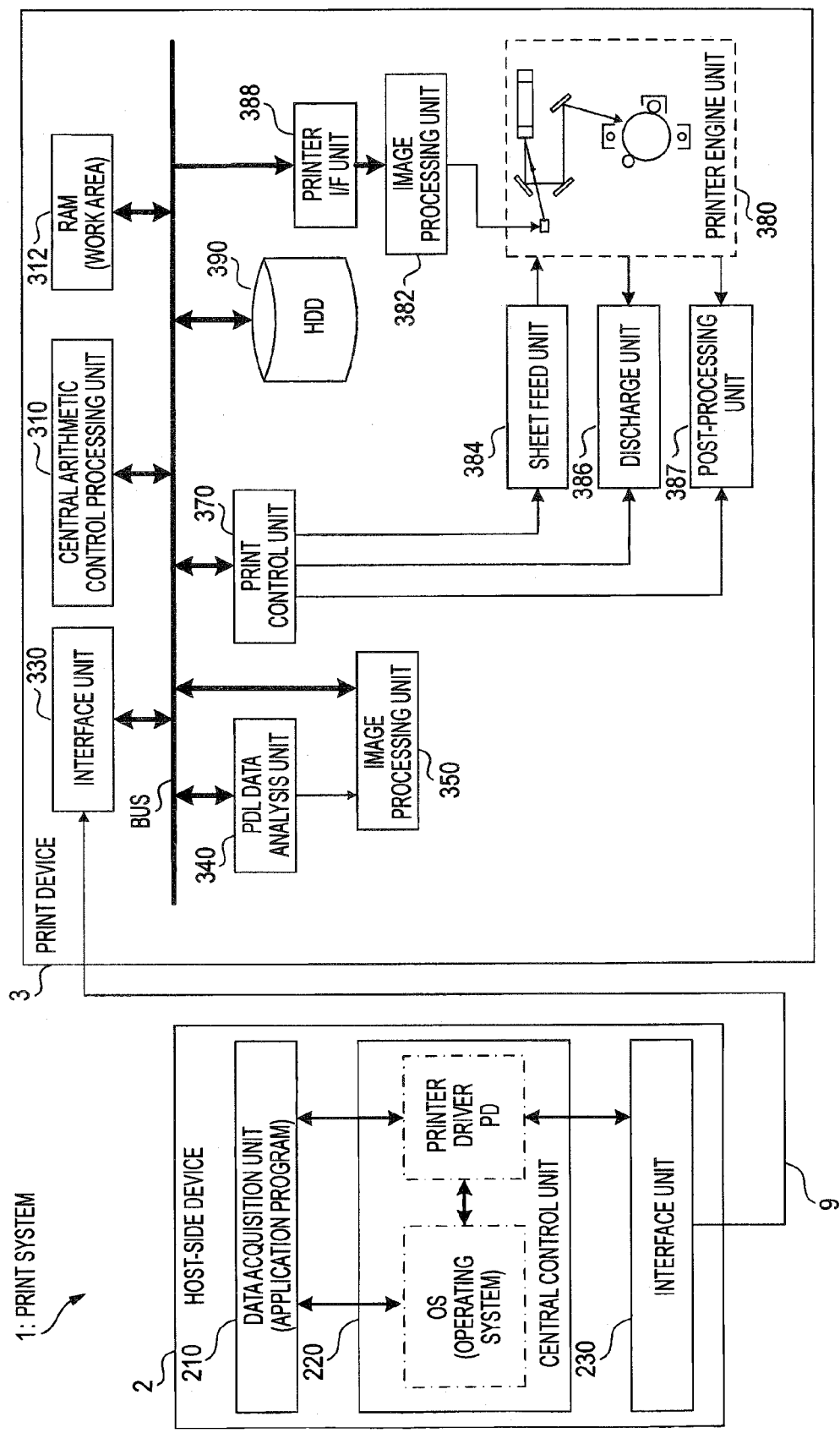

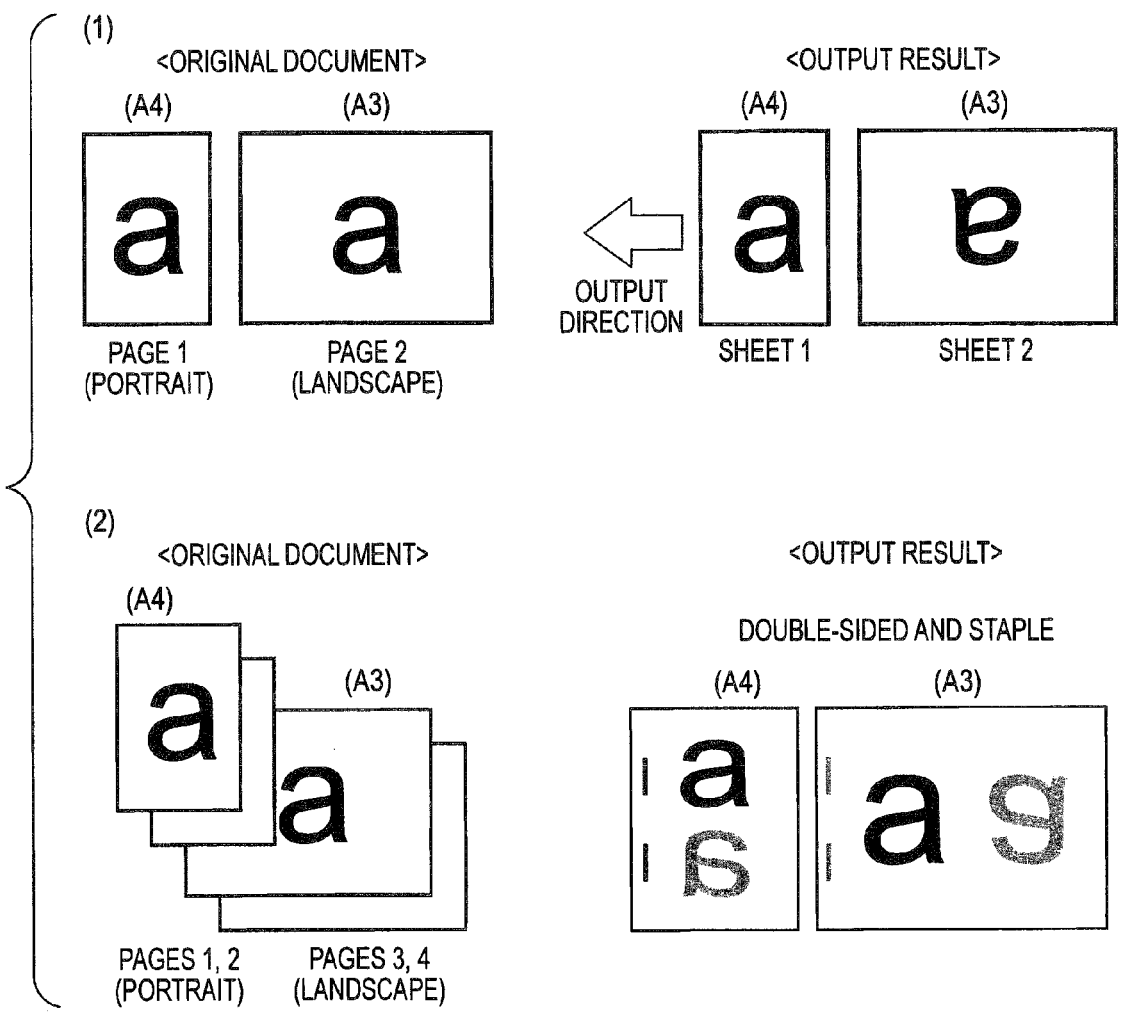

FIRST EMBODIMENT (FIRST CONFIGURATION EXAMPLE)

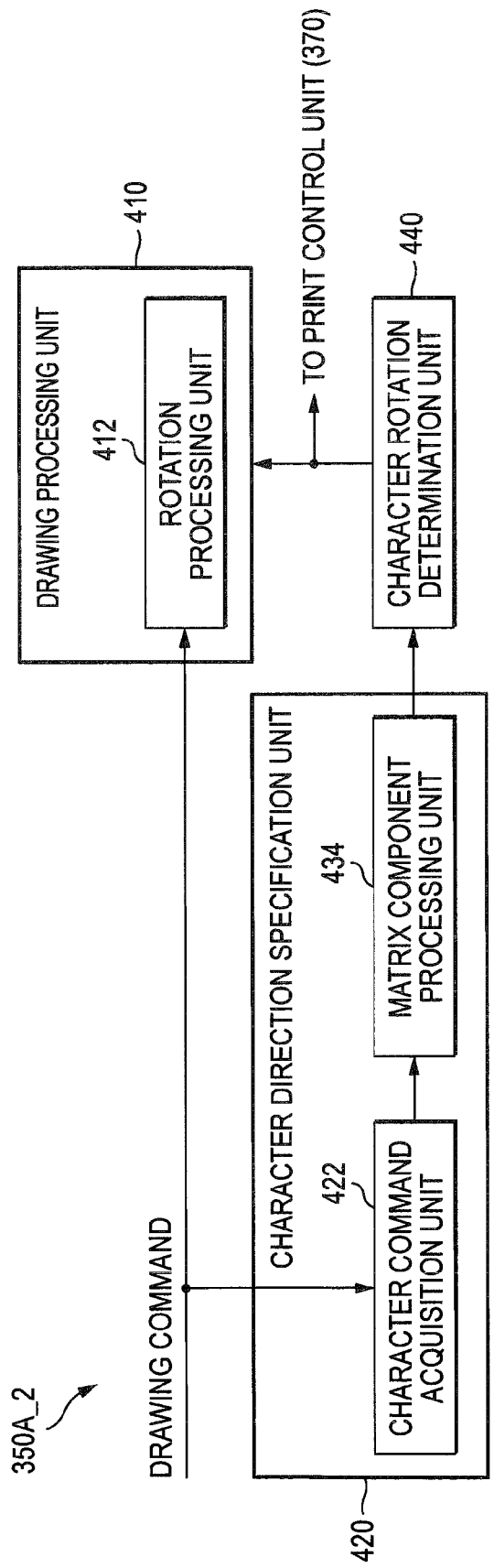

$$\begin{bmatrix} Xx & Yx \\ Xy & Yy \end{bmatrix} = \begin{bmatrix} \cos\theta & -\sin\theta \\ \sin\theta & \cos\theta \end{bmatrix}$$

CHARACTER VECTOR IN X-AXIS DIRECTION: $(Xx, Xy) = (\cos\theta, \sin\theta)$

CHARACTER VECTOR IN Y-AXIS DIRECTION: $(Yx, Yy) = (-\sin\theta, \cos\theta)$

FIG. 7

CHARACTER ROTATION DIRECTION DECISION PROCESSING
(ROTATION DETERMINATION OF DRAWING AREA)

(1) WHEN THIS EMBODIMENT IS NOT APPLIED

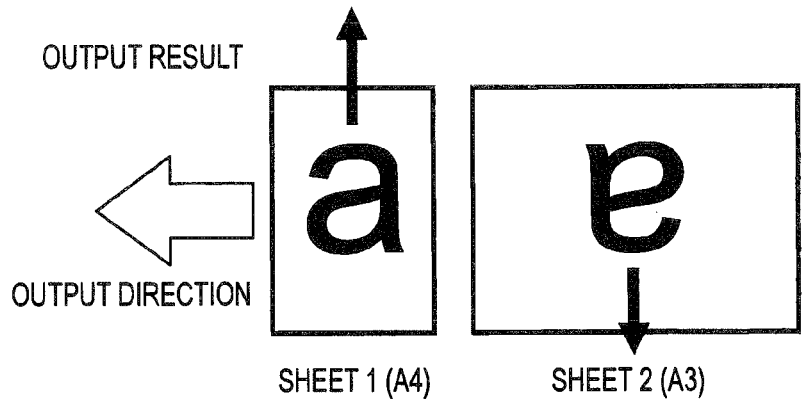

(2) WHEN THIS EMBODIMENT IS APPLIED

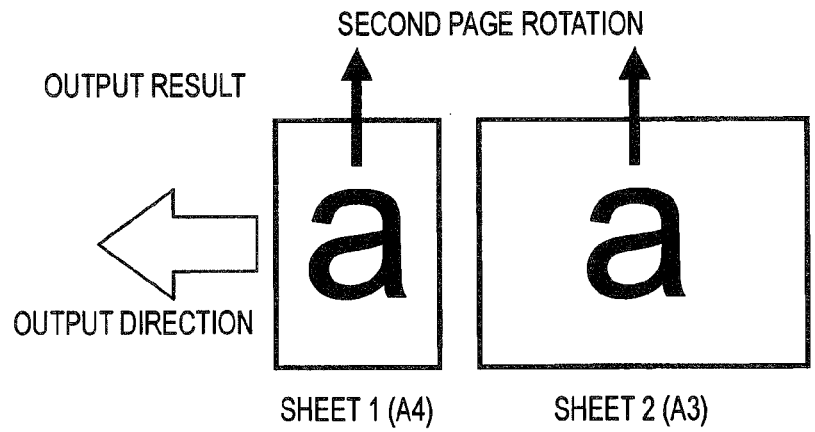

WHEN IT IS DETERMINED ON THE BASIS OF DETERMINATION RESULT OF VECTOR DIRECTION OF EACH PAGE THAT PAGES HAVE DIFFERENT DIRECTIONS, ROTATION IS MADE SUCH THAT CHARACTER DIRECTIONS ARE ARRANGED, AND PRINT IS THEN PERFORMED

FIRST EMBODIMENT

*REGION DESIGNATION DATA
SPECIFIC REGION IS DESIGNATED IN ADVANCE WITH MASK REGION, RECTANGULAR REGION, OR THE LIKE, SO ONLY FEATURE REGION IN WRITING IS SPECIFIED
DESIGNATION UNIT IS PDL, USER INTERFACE SCREEN, OF THE LIKE

SECOND EMBODIMENT

THIRD EMBODIMENT

FIG. 14

WEIGHTING PROCESSING (THIRD EMBODIMENT)

(1) DEFINITION OF CONTINUOUS COMMANDS

CHARACTER DRAWING COMMAND           FONT
    DRAWING POSITION X-DIRECTION COORDINATE   X
    DRAWING POSITION Y-DIRECTION COORDINATE   Y
    CHARACTER CODE                      CHAR ← WHEN CHARACTER STRING IS
                                               CONTINUOUSLY DESIGNATED,
                                               MULTIPLE CHARACTER CODES
                                               ARE DESCRIBED (2) SPECIFIC EXAMPLE

WHEN CHARACTERS "ABC" ARE DRAWN AT POSITION OF COORDINATE (100, 200)

DRAWING COMMAND
      "FONT  100  200  41  42  43"

· VECTOR DETERMINATION OF "A"
      VECTOR IS (0, 1)

· WEIGHTING PROCESSING
      VECTOR (0, 1) OF "A" IS MULTIPLIED BY
      NUMBER OF CHARACTERS (= 3)

```
ABC
•
(100, 200)
```

THIRD EMBODIMENT

FOURTH EMBODIMENT

FOURTH EMBODIMENT

FIFTH EMBODIMENT (FIRST CONFIGURATION EXAMPLE)

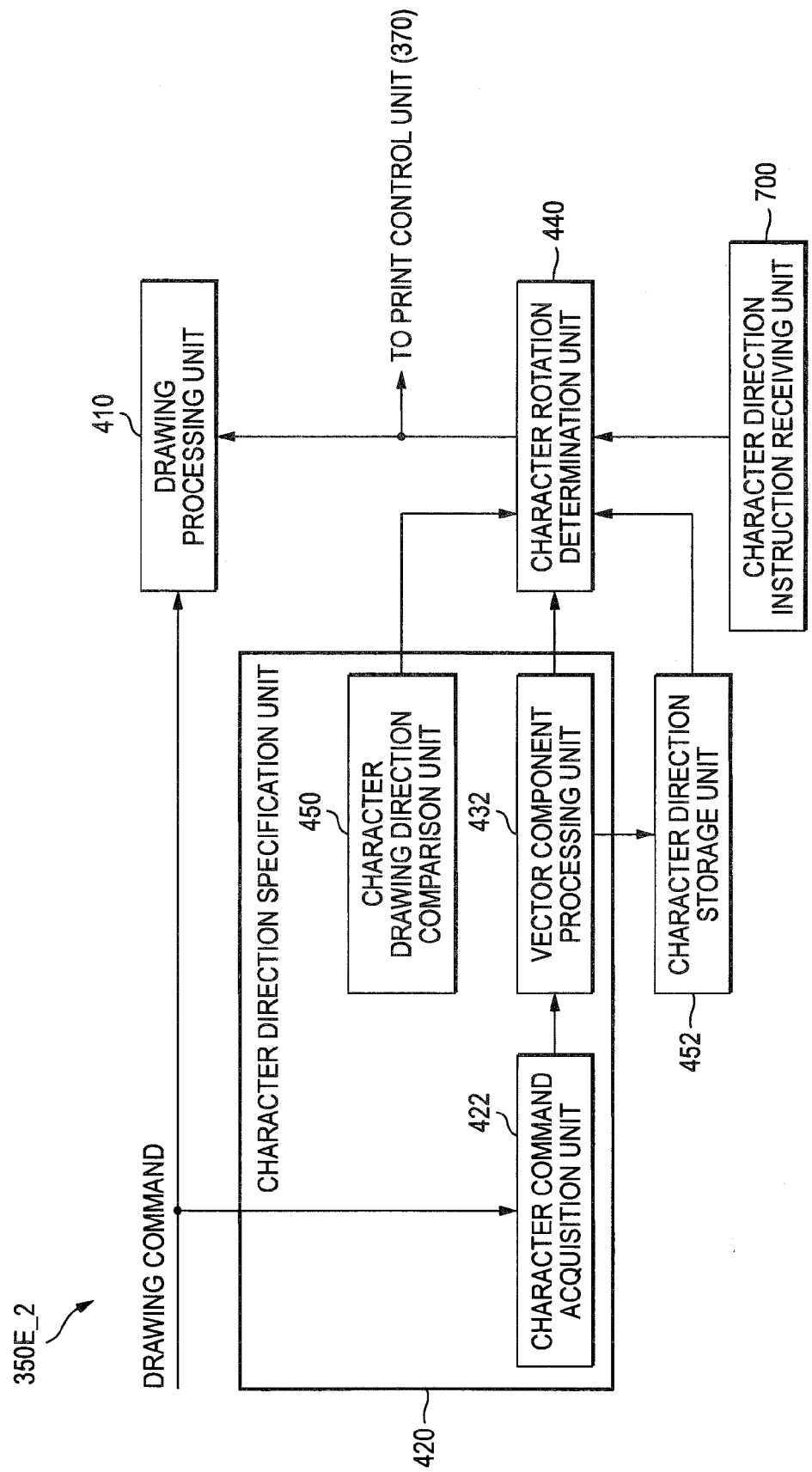

FIFTH EMBODIMENT (FIRST EXAMPLE)

FIFTH EMBODIMENT (SECOND EXAMPLE)

(CONT.)

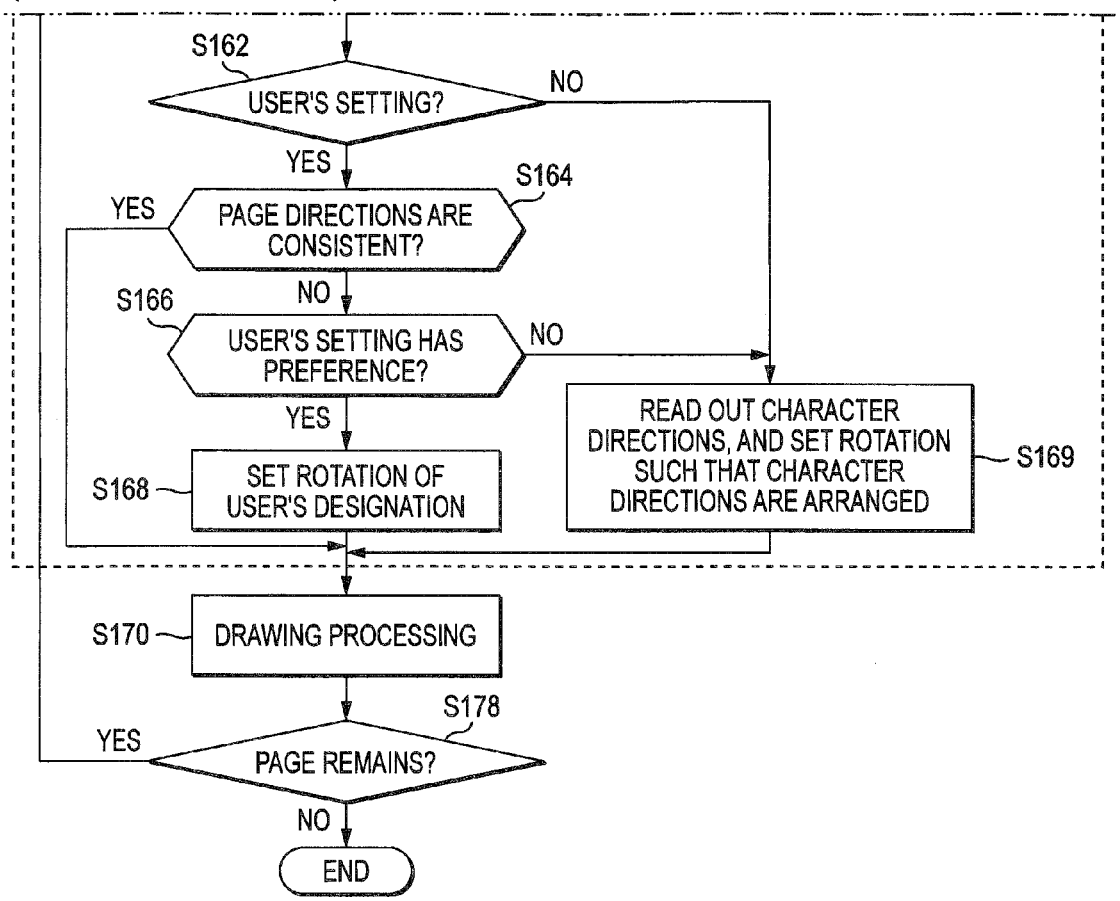

CHARACTER OUTPUT DEVICE, CHARACTER OUTPUT METHOD AND COMPUTER READABLE MEDIUM

CROSS-REFERENCE TO RELATED APPLICATIONS

This application is based on and claims priority under 35 USC 119 from Japanese Patent Application No. 2009-055902 filed Mar. 10, 2009.

BACKGROUND

1. Technical Field

The present invention relates to a character output device, a character output method and a computer readable medium.

2. Related Art

At the time of print processing by an image forming device including a print device, there are cases where sheet sizes or sheet directions are mixed. That is, drawing for multiple sheets with different sizes is mixedly designated in the same document.

SUMMARY

According to an aspect of the invention, a character output device includes: a character direction specification unit that specifies a drawing direction of characters for each processing-target region of a processing-target page; a character rotation determination unit that determines as to whether the processing-target page rotates or not based on a relation between the specified drawing direction and a direction of an output medium; and an output unit that performs an output processing based on the determination by the character rotation determination unit.

BRIEF DESCRIPTION OF THE DRAWINGS

Exemplary embodiment(s) of the present invention will be described in detail based on the following figures, wherein:

FIG. 1 is a diagram showing a configuration example of a print system;

FIG. 2 is a diagram illustrating problems of a character drawing processing;

FIG. 3B is a diagram showing the configuration of an image processing unit of a first exemplary embodiment (first configuration example);

FIG. 7 is a diagram illustrating the operation of a character rotation determination unit;

FIG. 14 is a diagram illustrating the operation of a weighting processing unit;

FIG. 19B is a diagram showing the configuration of the image processing unit of the fifth exemplary embodiment (second configuration example);

DETAILED DESCRIPTION

Figure 3A:
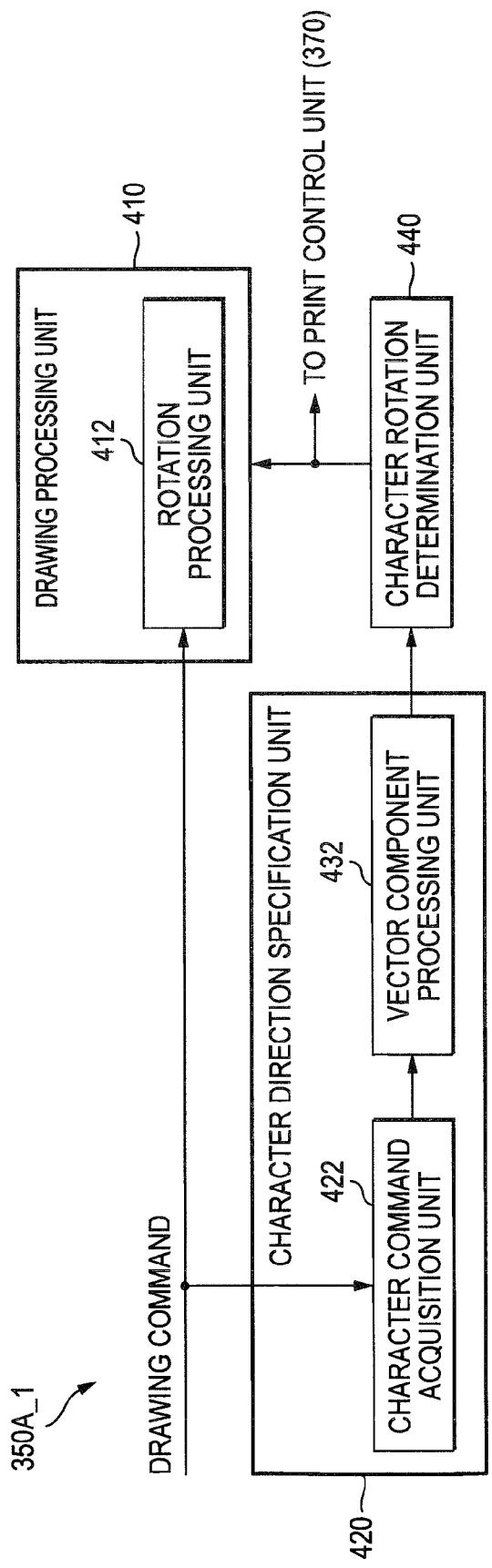
FIG. 3A is a diagram showing the configuration of an image processing unit of a first exemplary embodiment (first configuration example)

Hereinafter, exemplary embodiments of the invention will be described in detail with reference to the drawings.

A character output device may be an image forming device (so-called print device) that prints characters onto a print medium, such as paper, OHP (Over Head Projector) sheet, or the like, or a display device that displays characters on a display medium, such as liquid crystal, CRT (Cathode Ray Tube), or the like. A description will be made below assuming that a print system uses a print device as a character output device as a representative.

<System Configuration>

FIG. 1 is a diagram showing a configuration example of a print system. A print system 1 of this exemplary embodiment is configured such that a host-side device 2 and a print device 3 are connected to each other through a transmission path 9 which is an example of a communication unit. The print device 3 may be a single function device (so-called printer) having only a print function, or a multi function device having a print function and other functions, such as copy, FAX, or the like.

The host-side device 2 creates and outputs document data including characters, graphics, or photos, and for example, a personal computer is used. Document data including characters, graphics, or photos created by the host-side device 2 is sent to the print device 3 as print data (PDL data) which is described in PDL (Page Description Language). With PDL data, images (photos), graphics, characters, and the like are treated in the same manner, and expansion, rotation, modification, and the like of graphics, characters, or the like can be freely controlled.

[Host-Side Device]

The host-side device 2 has a data acquisition unit 210 generating image data, such as document, graphics, or the like, a central control unit 220 controlling the operations of respective units of the host-side device 2, and an interface unit 230 (IF unit) functioning as an interface with the print device 3.

The data acquisition unit 210 is embedded with an application program for generating data, such as document, graphics, or the like. The data acquisition unit 210 may contribute to import and print data generated outside.

The central control unit 220 is embedded with an OS (operating system) which is software for the overall control of the host-side device 2, and a printer driver PD which is software for the control of the print device 3.

Thus, the host-side device 2 implements a device, which issues a print instruction to the print device 3, by software on the basis of the program. That is, a program for constituting each functional unit is read out from a CD-ROM or the like in which the relevant program is stored, and is installed on a hard disk device or the like (not shown). Then, the program is read out from the hard disk device, and a CPU (Central Processing Unit) or an MPU (Micro Processing Unit) (not shown) constituting the central control unit 220 carries out a fixed processing procedure, so each function is implemented by software.

Hardware, various kinds of devices, and various kinds of software in the host-side device 2 are controlled and managed by the operating system OS. The application program operates under the control and management of the operating system OS. The application program instructs to print characters, images, or the like. Let us say that contents to be printed are output as drawing information which is described in the page description language.

For example, drawing commands including an image drawing command, a graphic drawing command, a font drawing command, and the like are sequentially input from the application program embedded in the host-side device 2 to the printer driver PD.

The printer driver PD is a program that is usually provided along with the print device 3 and is loaded on the host-side device 2. The printer driver PD makes the host-side device 2 responsive to various data formats which are expected to be used in a specific print device 3. When drawing information is received from the application program, the printer driver PD carries out various processing steps prior to transmitting the drawing information to the print device 3. For example, the drawing information received from the application program is transmitted after being converted into a string of commands and drawing objects so as to be analyzed by the print device 3.

In this exemplary embodiment, the printer driver PD converts a drawing command into PDL data as a print command so as to be understood by the print device 3, and outputs PDL data to the interface unit 230. The print command input to the interface unit 230 is transmitted to the print device 3 through the transmission path 9 (connection cable or network). The print device 3 prints an image on a sheet (image output) in accordance with the received PDL data.

[Print Device]

The print device 3 is an example of an image output device, and carries out a print processing on the basis of print data (PDL data) output from the host-side device 2. Print data created in the PDL is a string of commands and data in which drawing commands and data representing image, graphics, and characters at arbitrary positions on the page are arranged in an arbitrary sequence. The print device 3 is a page printer which performs rendering (rendering) on image data for every output unit (for every page) before print and outputs raster data to a printer engine unit.

To implement such functions, the print device 3 has a central arithmetic control processing unit 310, a RAM 312 (RAM: Random Access Memory), an interface unit 330, a PDL data analysis unit 340 (interpreter), and an image processing unit 350 as an example of a drawing processing device. The print device 3 also has a print control unit 370 (output control unit), a printer engine unit 380, an image processing unit 382, a sheet feed unit 384, a discharge unit 386, a post-processing unit 387, a printer I/F unit 388, and a hard disk device (HDD) 390.

The central arithmetic control processing unit 310 controls the entire print device 3. The interface unit 330 functions as an interface with the host-side device 2.

The PDL data analysis unit 340 is an example of a drawing command output device which analyzes PDL data and delivers the obtained drawing command to the image processing unit 350. The PDL data analysis unit 340 recognizes imported drawing information or a string of commands and drawing data, and analyzes the commands by assembling the commands and arguments.

The image processing unit 350 performs graphics drawing, character drawing, and image drawing on the basis of the analyzed command received from the PDL data analysis unit 340 so as to generate bitmap data (raster data). In this case, the image processing unit 350 temporarily stores generated data in a page memory area of the hard disk device 390. For example, at the time of color print, for each color, an image is rasterized to four planes of C (cyan), M (magenta), Y (yellow), and K (black), which are individually stored in the page memory area of the hard disk device 390. The page memory area may be ensured in the RAN 312, instead of the hard disk device 390.

The print control unit 370 is an example of an output control unit, and controls the print processing by the printer engine unit 380 on the basis of bitmap data rendered by the image processing unit 350. The printer engine unit 380 carries out the print processing in accordance with a command from the print control unit 370. The printer I/F unit 388 is provided between the printer engine unit 380 and a system bus. The printer engine unit 380 is an example of an image forming unit (image output unit) which forms an image on an output medium on the basis of data processed by the image processing unit 350.

The print control unit 370 activates the printer engine unit 380 when carrying out print, and supplies bitmap data for each output unit to the printer engine unit 380 through the printer I/F unit 388.

The printer engine unit 380 is an example of an output processing unit which forms and outputs an image onto the sheet in accordance with bitmap data supplied through the printer I/F unit 388. That is, the printer engine unit 380 actually forms an image on the recording medium in accordance with image data stored in the page memory area. For the printer engine unit 380, for example, a recording method using various systems, such as a laser system and the like, may be used. In this case, the image processing unit 382 may perform binarization or screen processing.

Though not shown, the sheet feed unit 384 includes one or multiple sheet feed trays, and accommodates sheets as an example of print medium, which is supplied to the printer engine unit 380.

Though not shown, the discharge unit 386 includes a discharge tray onto which a sheet is discharged after the print processing is carried out by the printer engine unit 380. When receiving a rotation angle and a rotation instruction from the print control unit 370, the discharge unit 386 rotates and discharges the sheet at the rotation angle based on the instruction.

If a post-processing instruction is appended to the print instruction, the post-processing unit 387 carries out post-processing in accordance with the instruction. The term "post-processing" includes stapling of output sheets using a stapler (short side binding or long side binding of sheets), or punching for forming punch holes on the short side or long side of sheets.

The hard disk device 390 is an example of a nonvolatile storage medium which stores raster data generated by the image processing unit 350. The hard disk device 390 also functions as an example of a data storage unit which temporarily stores the drawing objects and the drawing arithmetic instruction (collectively referred to as drawing command) analyzed and converted by the PDL data analysis unit 340.

<Problem of Character Drawing Processing and Principle of Improvement>

FIG. 2 is a diagram illustrating a problem of a character drawing processing.

In the recent office environment, text of multiple sheet sizes is increasingly created according to the purposes, and the high performance of the print device 3 enables complex post-processing (finishing). Incidentally, an output processing of a document with different sheet sizes is instructed. Such a document includes an image (called portrait image) in which a character is in a regular state when the sheet is portrait-oriented and an image (called landscape image) in which a character is in a regular state when the sheet is landscape-oriented are mixed. In this case, the output directions may differ (the drawing directions of output results differ). The term "drawing direction" means the direction (of the regular state) that a person can suitably read the characters.

(1) of FIG. 2 shows a case where an instruction is made to output a document (original document) of two pages of an A4-size first page as a portrait image and an A3-size second page as a landscape image. With regard to the sheet feed unit 384, let us say that A4-size sheets are accommodated in a first sheet feed tray so as to be vertically fed, and A3-size sheets are accommodated in a second sheet freed tray so as to be horizontally fed. The term "vertical feed" means that the sheet is fed with the long side of the sheet in the lead, and the term "horizontal feed" means that the sheet is fed with the short side of the sheet in the lead.

In this case, while the characters are output in a regular state on the A4 original document of the first page (portrait image), the characters are output in an inverted state on the A3 original document of the second page (landscape image). That is, in the case of one-sided output of an original document with different sheet size, the drawing direction of the page of the landscape image (A3 size) is opposite to the drawing direction of the first page.

(2) of FIG. 2 shows a case where with regard to a document (original document) of four pages of A4-size first and second pages as portrait images and A3-size third and fourth pages as landscape images, stapling and double-side print (long side binding) are instructed. With regard to the sheet feed unit 384, let us say that A4-size sheets are accommodated in a first sheet feed tray so as to be vertically fed, and A3-size sheets are accommodated in a second sheet feed tray so as to be horizontally fed.

In this case, on the front and rear surfaces of the A4 original document of the first and second pages (portrait image), the characters are output in a regular state. However, with regard to the A3 original document of the third and fourth pages (landscape image), while the character is output in a regular state on the front surface (corresponding to the third page), the characters are output in an inverted state on the rear surface (corresponding to the fourth page). That is, in the case of double-sided print of the landscape image (A3 size), the drawing direction of the front and rear surfaces are opposite to each other.

In order to solve this problem, the user may change the settings of the printer driver. However, it is necessary for the user to execute an operation in order to change the settings, so this cannot be applied to an output mode in which the printer driver is not used.

In this exemplary embodiment, for each page, the relation between the drawing direction of the character and the direction of an output medium (feed mode) is specified, the character is rotated on the basis of the specification result such that the character can be suitably read on the output result (when post-processing is set to be performed, after the post-processing), and the output processing is then carried out.

The configuration that "the character is rotated and the output processing is then carried out" is a concept including a first mode in which the character is rotated in advance by an image processing such that the character can be suitably read, and character drawing is carried out on the output medium, and a second mode in which, when character drawing is carried out on the output medium, the character is not rotated, and the printed output medium is rotated, such that the character can be suitably read on the output result (when post-processing is set to be performed, after the post-processing).

In the first mode, before character drawing is actually carried out on the output medium, it is determined whether the drawing direction of the character on the output medium serving as the output result when this exemplary embodiment is not applied is in a regular state or not, and when the drawing direction of the character is not in the regular state, the character is rotated by image processing in advance (before actual drawing processing). This method does not cause the mechanism of the discharge unit 386 to be complicated, but a rotation processing unit 412 needs to be provided in a drawing processing unit 410.

In the second mode, after character drawing is carried out on the output medium, like in the related art, and the output medium is then rotated such that the drawing direction of the character on the output medium as the output result is in the regular state. Determination of rotation/non-rotation may be executed before or after character drawing. This method causes the mechanism of the discharge unit 386 to be complicated, but the rotation processing unit 412 does not need to be provided in the drawing processing unit 410.

In the second mode, when the character direction or rotation/non-rotation is determined using a raster image (including the output result) after the character drawing processing, a method that extracts and recognizes a character from the raster image, and determines whether the character direction is in the regular state or not. This method can address a copied original document, but it causes the device configuration or processing to be complicated.

In this exemplary embodiment, when print data includes a character command, in any of the first and second modes, the drawing direction of each character may be specified from the analysis result of the character drawing command. Further, when multiple characters are present in a fixed region (the entire page or a specific area on the page), the character direction is specified as a whole, and finally, one of four orthogonal directions (upward, downward, leftward, and rightward: in particularly, referred to as character top direction) to which the character direction as a whole corresponds is specified. Then, it is determined on the basis of the relation between the character drawing direction (particularly, "character top direction") and the feed mode of each output medium whether or not the page is rotated.

Image Processing Unit

First Exemplary Embodiment

Device Configuration

FIGS. 3A to 3B are diagrams showing the configuration of an image processing unit 350A of the first exemplary embodiment. FIG. 3A shows a first configuration example, and FIG. 3B shows a second configuration example.

A image processing unit 350A of the first exemplary embodiment includes a drawing processing unit 410, which carries out graphics drawing, character drawing, and image drawing, a character direction specification unit 420, and a character rotation determination unit 440.

The drawing processing unit 410 includes a rotation processing unit 412 which rotates a drawn image in units of 90°. When a rotation instruction is received from the character rotation determination unit 440 along with a rotation angle, the rotation processing unit 412 carries out the drawing processing at the rotation angle based on the instruction.

The character direction specification unit 420 specifies the character direction over the entire fixed region of the document on the basis of the direction of each character. In the first exemplary embodiment, the term "fixed region" means the entire page. The character direction specification unit 420 has a character command acquisition unit 422 and a character vector processing unit.

The character command acquisition unit 422 acquires a character command in the document, and delivers the character command to the character vector processing unit.

The character vector processing unit includes any one of a vector component processing unit 432 and a matrix component processing unit 434. A configuration that the vector component processing unit 432 is provided is an image processing unit 350A_1 of a first configuration example shown in FIG. 3A, and a configuration that the matrix component processing unit 434 is provided is an image processing unit 350A_2 of a second configuration example shown in FIG. 3B.

The vector component processing unit 432 specifies the character direction over the entire region by arithmetic synthesis of an x-direction component and a y-direction component of a character vector (details thereof will be described below) on the absolute coordinate system. The matrix component processing unit 434 specifies the character direction over the entire region by arithmetic synthesis of a matrix of two rows and two columns (called font coordinate matrix) with, as a variable, the rotation angle θ of the character coordinate system with respect to the absolute coordinate system.

[Character Direction Specification Processing]

Figure 4A:
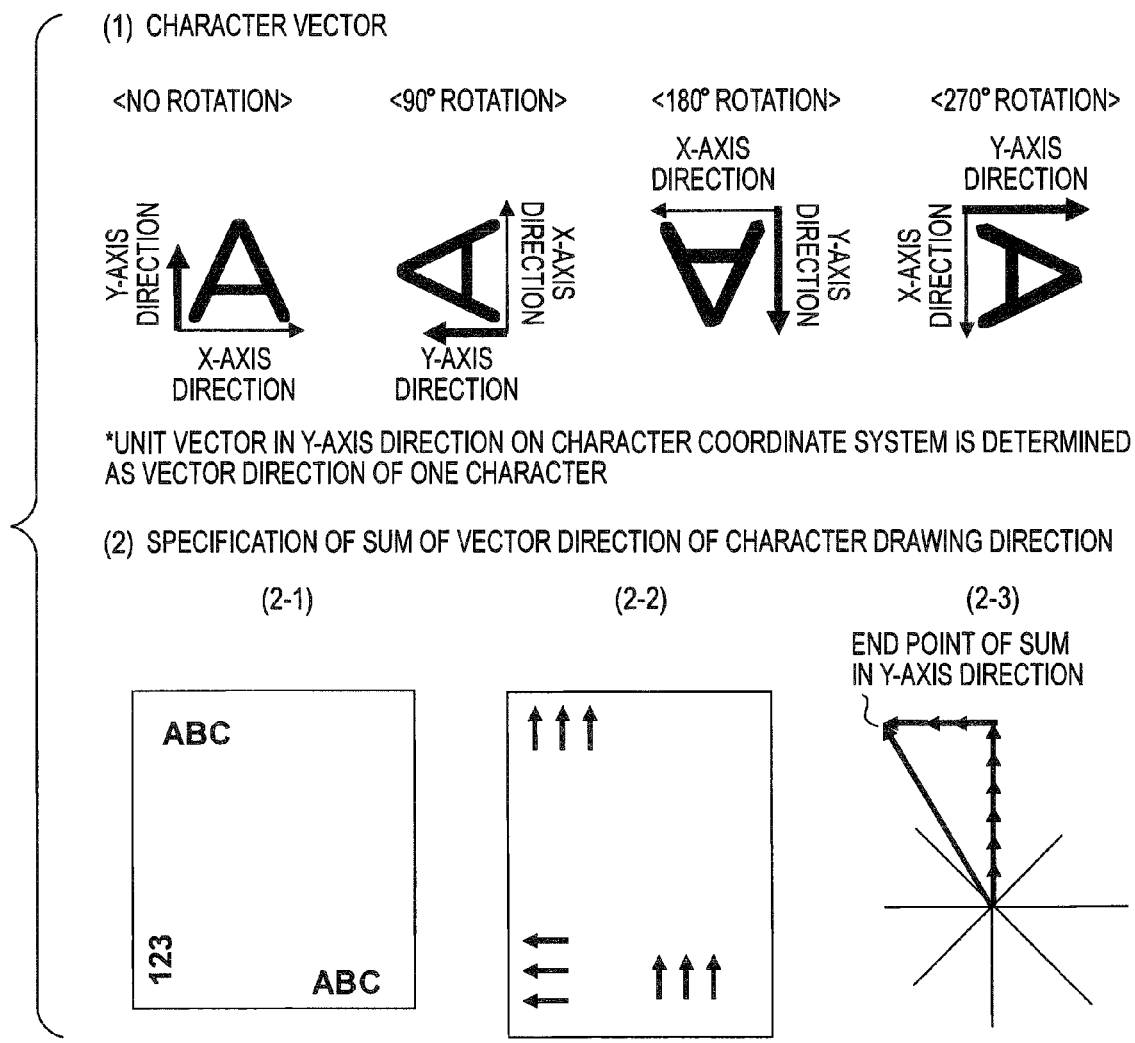
FIG. 4A is a diagram illustrating the basic operation of a character direction specification unit.
Figure 4B:
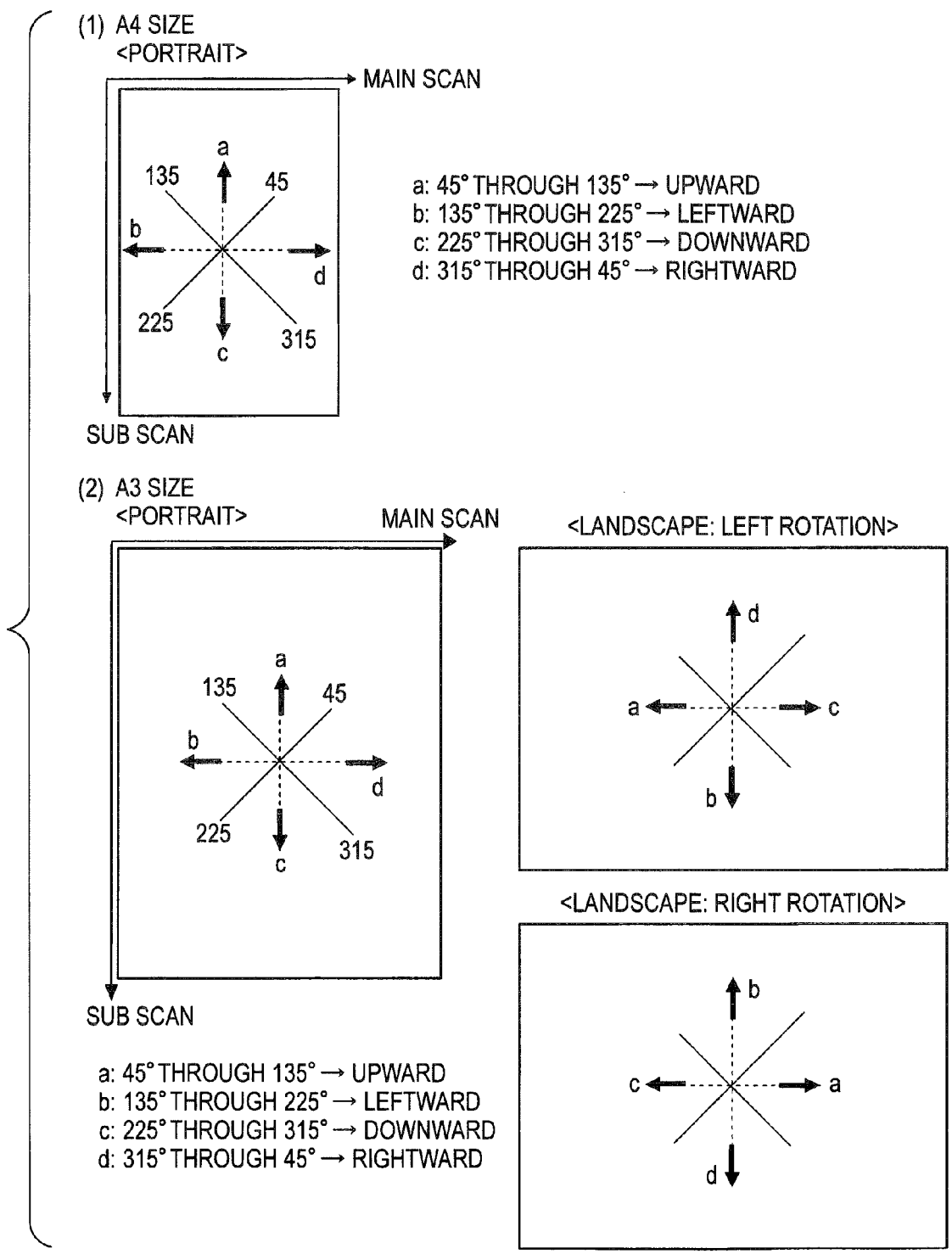
FIG. 4B is a diagram illustrating a method of deciding a character top direction.

FIGS. 4A through 4B are diagrams illustrating the basic operation of the character direction specification unit 420. (1) of FIG. 4A is a diagram illustrating a character vector which is treated by the character direction specification unit 420. (2) of FIG. 4A is a diagram illustrating a method of specifying a character direction as a whole based on the character vector of each character. FIG. 4B is a diagram illustrating a method of deciding the top direction of each character when the characters are drawn on the output medium on the basis of the specified character direction as a whole.

In this exemplary embodiment, the term "character vector" means each unit vector in an X-axis direction (horizontal direction) and a Y-axis direction (vertical direction) on the character coordinate system (a coordinate system at the time of viewing a character orthoscopically), as shown in (1) of FIG. 4A. This is used as information for specifying the drawing direction of each character. Within the X-axis direction and the Y-axis direction, the component of the Y-axis direction is the direction in a state where a character is viewed orthoscopically. Therefore, when any one of the X-axis direction and the Y-axis direction is used as information specifying the character direction, the unit vector of the Y-axis direction may be used.

For example, on the character coordinate system, it may suffice to specify one of the four orthogonal directions, to which the direction in a state where a character is viewed orthoscopically (the direction of the unit vector in the Y-axis direction) corresponds. In this case, it is necessary to focus on whether the rotation angle is 0°, 90°, 180°, or 270°.

The character vector processing unit decides the unit vector in the Y-axis direction of "the character vector" as the vector direction of each character with regard to each character in "the fixed region" for each page.

The character direction specification unit 420 specifies, as shown in (2) of FIG. 4A, the vector direction ((2-2) of FIG. 4A) with regard to each character in "the fixed region (in this case, the entire page)" ((2-1) of FIG. 4A), and then specifies the direction of the sum ((2-3) of FIG. 4A). That is, the sum of the vector directions of the character drawing direction is calculated with regard to each page, so the direction of the sum of the characters (particularly, the end point of the sum in the Y-axis direction) is specified. When multiple characters, not a character, are present in the processing-target region (the entire page or a designated specific region), the character drawing direction as a whole is specified on the basis of the sum of the directions of the characters in the processing-target region.

The character direction specification unit 420 specifies, as shown in FIG. 4B, the top direction of each character on each page of the document on the basis of the specified direction of the sum of the directions of the characters. With regard to "the character top direction", one of the four orthogonal directions of upward (up direction), downward (down direction), leftward (left direction), and rightward (right direction), to which "the direction of the sum of the characters" corresponds, is specified with, as reference, a state where a sheet is placed vertically. For example, in the case of 45° through 135°, the top direction is upward, in the case of 135° through 225°, the top direction is leftward, in the case of 225° through 315°, the top direction is downward, and in the case of 315° through 45°, the top direction is rightward. When being just consistent with the boundary, the top surface corresponds to any direction.

(1) of FIG. 4B shows the state of the A4 size. In the case of a portrait image, many characters are placed vertically and described in an orthoscopic state, so the direction of the sum of the characters is considered to be within the range of 45° through 135°. Therefore, the character top direction becomes upward.

(2) of FIG. 4B shows the state of the A3 size. In the case of a landscape image, many characters are placed horizontally and described in an orthoscopic state, so the direction of the sum of the characters is considered to be within the range of 135° through 225° or 315° through 45°. Therefore, the character top direction becomes rightward or leftward. This depends on whether, with the drawing processing and the paper transport system, the A3-size sheet in a vertically placed state is rotated right to be in a horizontally placed state or is rotated left to be in a horizontally placed state. Consequently, the characters may be output in an inverted state.

Next, the specific operation of the vector component processing unit 432 or the matrix component processing unit 434 that performs a series of processing, such as "character vector specification" "specification of direction of sum of characters", or the like, will be described.

[Vector Component Processing]

Figure 5:
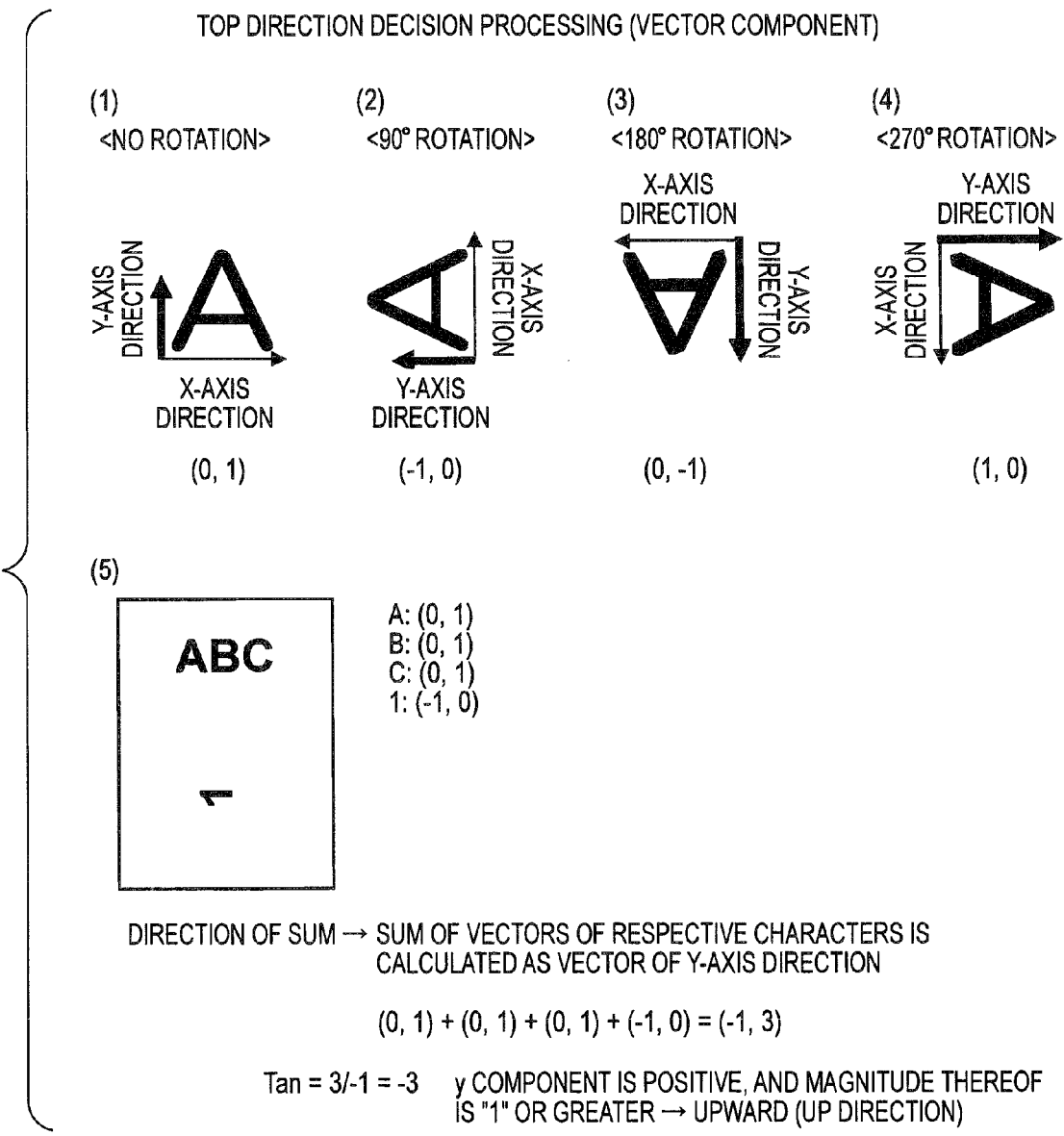
FIG. 5 is a diagram illustrating a vector component processing unit.

FIG. 5 is a diagram illustrating the operation of the vector component processing unit 432.

The vector component processing unit 432 expresses the x-direction component and the y-direction component of the character vector in the Y-axis direction of each character on the absolute coordinate system (xy coordinate system) by (x,y), and performs arithmetic synthesis (may be simple addition processing) on the x-direction components and the y-direction components separately, thereby specifying the character direction over the entire region. That is, the direction of the end point of the sum of the character vectors in the Y-axis direction is specified.

For example, let us say that the character vector when the rotation angle of the character coordinate system with respect to the absolute coordinate system (xy coordinate system) is 0° ((1) of FIG. 5) is (0,1), the character vector when the rotation angle is 90° ((2) of FIG. 5) is (−1,0), the character vector when the rotation angle is 180° ((3) of FIG. 5) is (0,−1), and the character vector when the rotation angle is 270° ((4) of FIG. 5) is (1,0).

When a page such as shown in (5) of FIG. 5 on which four characters are described with the rotation angle of three characters "A, B, and C" of 0° and with the rotation angle of one character of "1" of 90° is to be processed the character direction over the entire region (entire page) becomes "(0,1)+(0, 1)+(0,1)+(−1,0)=(−1,3)".

The tangent expressed by (−1,3) is "3/−1=−3", and the y-direction component is "positive" and has a magnitude of "1" or greater, so it falls within the range of 45° through 135°. For this reason, the character direction over the entire page is specified to be upward (up direction).

[Matrix Component Processing]

Figure 6A:
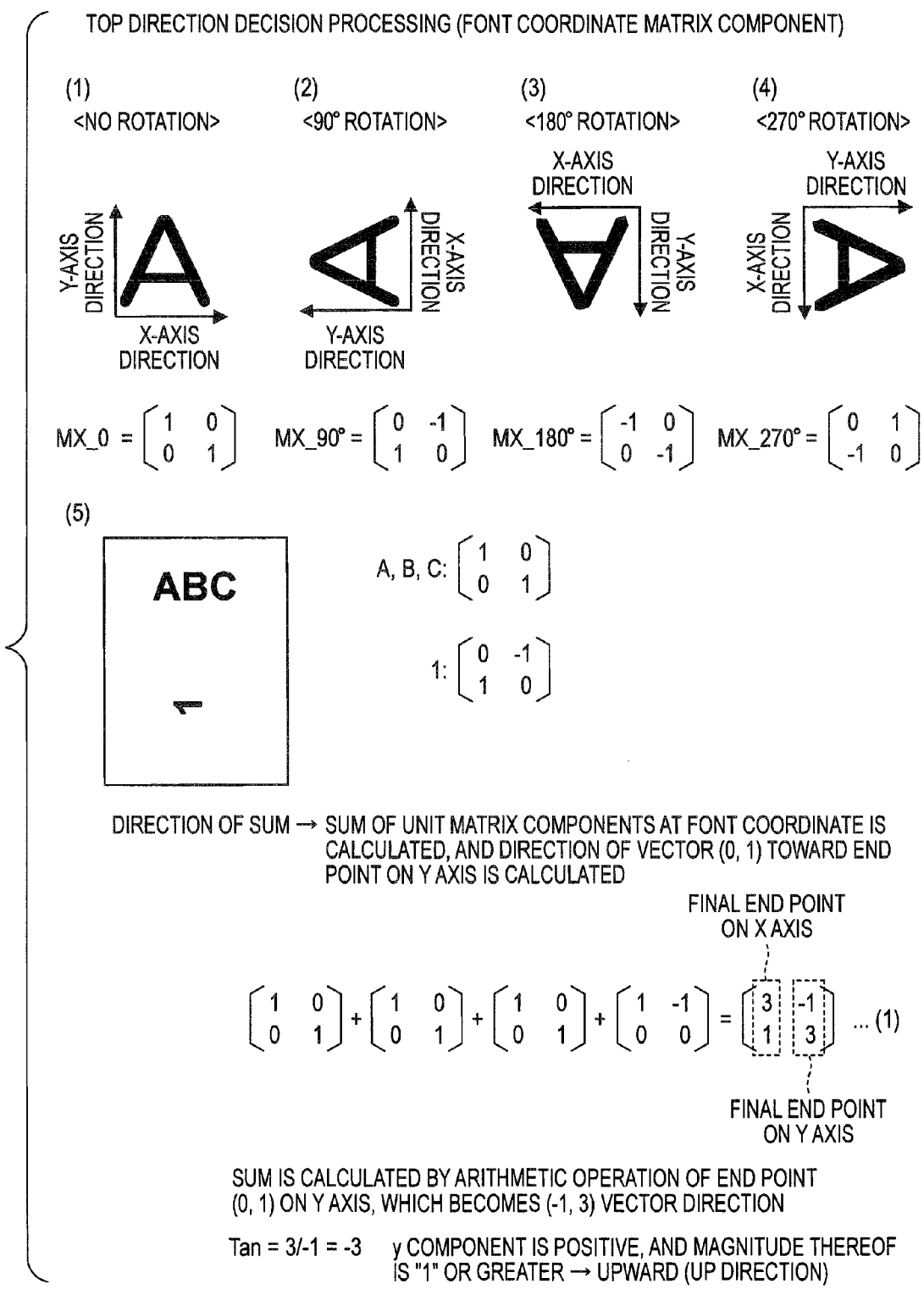
FIG. 6A is a diagram illustrating the operation of a matrix component processing unit 434.

FIG. 6A is a diagram illustrating the operation of the matrix component processing unit 434.

The matrix component processing unit 434 converts the character vector of each character (each unit vector in the X-axis direction and the Y-axis direction) into a font coordinate matrix with, as a variable, the rotation angle θ of the character coordinate system with respect to the absolute coordinate system (xy coordinate system).

In the font coordinate matrix, the x-direction component of the unit vector in the X-axis direction is a value of the first row and the first column, and the y-direction component is a value of the second row and the first column. The x-direction component of the unit vector in the Y-axis direction is a value of the first row and the second column, and the y-direction component is a value of the second row and the second column.

The matrix component processing unit 434 specifies the character direction over the entire region by arithmetic synthesis of the font coordinate matrixes of the respective characters. At this time, the matrix component processing unit 434 calculates the sum of the unit matrix components (font coordinate matrixes) at the font coordinate, and performs an arithmetic operation on a direction of the vector toward the end point of the sum of the unit vectors in the Y-axis direction.

For example, let us say that the font coordinate matrix when the rotation angle of the character coordinate system with respect to the absolute coordinate system (xy coordinate system) is 0° ((1) of FIG. 6A) is MX_0, the font coordinate matrix when the rotation angle is 90° ((2) of FIG. 6A) is MX_90, the font coordinate matrix when the rotation angle is 180° ((3) of FIG. 6A) is MX_180, and the font coordinate matrix when the rotation angle is 270° ((4) of FIG. 6A) is MX_270.

When a page such as shown in (5) of FIG. 6A on which four characters are described with the rotation angle of three characters "A, B, and C" of 0° and the rotation angle of one character "1" of 90° is to be processed, the font coordinate matrix of the entire region (entire page) is expressed by Expression (1) shown in (5) of FIG. 6A.

The sum of the unit vectors in the Y-axis direction is shown in the second column. In this example, the x-direction component (a value of the first row and the second column) is "−1", and the y-direction component (a value of the second row and the second column) is "3". Therefore, the tangent is "3/−1=−3", and the y-direction component is "positive", and has a magnitude of "1" or greater, so it falls within the range of 45° through 135°. Therefore, the character direction over the entire page is specified to be upward (up direction). Of course, the same result as with "vector component processing" described with reference to FIG. 5 is obtained.

[Comparison of Vector Component Processing with Matrix Component Processing]

Figure 6B:
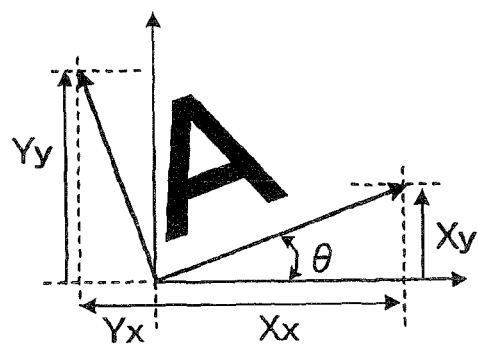
FIG. 6B is a diagram illustrating comparison of a vector component processing with a matrix component processing.

FIG. 6B is a diagram illustrating comparison of a vector component processing with a matrix component processing. In the previous example, description has been made assuming that, on the character coordinate system, the characters are disposed to have an orthogonal relation (the rotation angle θ is 0°, 90°, 180°, and 270°) on the character coordinate system, but the rotation angle θ may be arbitrary. In this case, the vector component processing and the matrix component processing have the relation such as shown in FIG. 6B from the matrix of two rows and two columns using the sine element (sin θ) and the cosine element (cos θ) of the rotation angle θ.

Comparing the vector component processing by the vector component processing unit 432 with the matrix component processing by the matrix component processing unit 434, as shown in FIG. 6B, the character top direction is specified by any method. The vector component processing is different from the matrix component processing as follows: in the former, the arithmetic operation is simple, but two variables are needed; and in the latter, one variable (rotation angle θ) may be used, but the arithmetic operation is complicated. It is difficult to decide any one to be superior to the other at one sweep.

[Character Rotation Direction Decision Processing]

FIG. 7 is a diagram illustrating the operation of the character rotation determination unit 440. The character rotation determination unit 440 specifies character rotation/unrotation for each page from the relation between "the character top direction" specified by the character vector processing unit and the feed direction of each output medium. On the basis of the relation between the sum of the vector directions for all characters and the sheet feed direction, that is, on the basis of how "the sum of the vector directions for all characters" is drawn on the sheet being fed, and what it has to do with pages, character rotation/unrotation for each page is determined.

For example, the character rotation determination unit 440 determines whether or not "the character top direction" as the determination result of the vector direction of each page is consistent. When the pages have different directions, any page is rotated and then printed. Basically, a page which is not in an orthoscopic state is rotated such that the characters on the output result are in an orthoscopic state.

(1) of FIG. 7 shows the state when the first exemplary embodiment is not applied. When an instruction is made to output a document (original document) of two pages of an A4-size first page as a portrait image and an A3-size second page as a landscape image, the characters are output in an orthoscopic state on the A4 original document of the first page (portrait image), but the characters are output in an inverted state on the A3 original document of the second page (landscape image).

(2) of FIG. 7 shows the state when the first exemplary embodiment is applied. The character vector processing unit specifies that the characters are output in an inverted state on the A3 original document of the second page (landscape image). Accordingly, the character rotation determination unit 440 instructs the rotation processing unit 412 of the drawing processing unit 410 or the print control unit 370 to rotate the second page. The rotation processing unit 412 that receives the instruction carries out the drawing processing at the rotation angle based on the instruction. The print control unit 370 that receives the instruction controls the discharge unit 386 to rotate the sheet at the rotation angle based on the instruction and discharge the sheet. As a result, even though the sheets have different in size, an output result is obtained in which the characters are in an orthoscopic state on any page.

Processing Procedure

First Exemplary Embodiment

Figure 8:
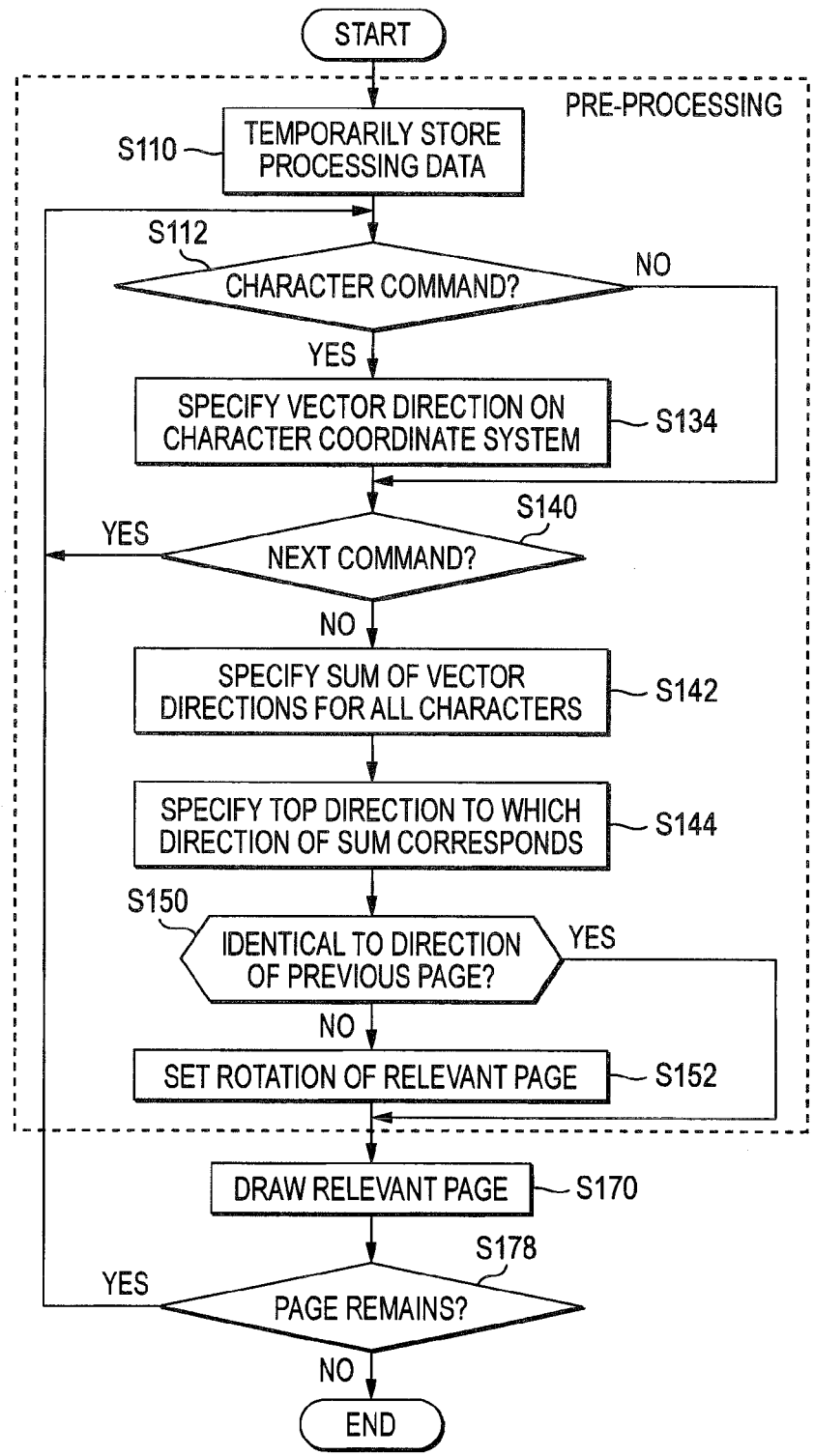
FIG. 8 is a flowchart illustrating the overall operation of the image processing unit of the first exemplary embodiment.

FIG. 8 is a flowchart illustrating the overall operation of the image processing unit 350A of the first exemplary embodiment.

When print data (PDL data) is received from the host-side device 2, the print device 3 temporarily stores data in the hard disk device 390 or the RAM 312, that is, spools processed data (S110).

The PDL data analysis unit 340 sequentially imports and analyzes spooled data. At this time, the PDL data analysis unit 340 determines whether or not a command is a character command (character command: character drawing command) (S112). The PDL data analysis unit 340 delivers all the character commands to the character command acquisition unit 422 of the character direction specification unit 420.

The character vector processing unit specifies the vector direction on the character coordinate system by the vector component processing unit 432 or the matrix component processing unit 434 in the same manner as described above for each character command (S134). This processing is continued until all the character commands are completed (S140).

After the vector direction is specified for all the character commands (S140—YES), the character vector processing unit specifies the sum of the vector directions for all the characters (S142).

The character vector processing unit specifies one of four "character top directions" to which the direction of the sum of the vector directions for all the characters (S144).

The character rotation determination unit 440 determines character rotation/unrotation for each page from the relation between "the character top direction" specified by the character vector processing unit and the feed direction of each output medium. Specifically, it is determined whether or not "the character top direction" of the previous page is identical to "the character top direction" of the current page (S150). If both are not identical, the character rotation determination unit 440 sets rotation of the relevant page (S152). Thereafter, the drawing processing unit 410 draws the relevant page (S170).

The image processing unit 350 confirms whether or not a page remains (S178), and if a page remains (S178—YES), the image processing unit 350 returns to Step S112 and performs processing of a next page.

Thus, in the first exemplary embodiment, with the preprocessing for the drawing processing indicated by a dotted line of FIG. 8, the top direction of the relevant page is specified, and when there is a difference from the direction of the previous page, rotation setting is validated. Over the entire page, the text top direction is decided, such that the characters are in an orthoscopic state on any page of the output result.

Therefore, the top direction of the document of multiple sheet sizes is automatically determined and output with no user's operation. Even though the user cannot determine the actual drawing direction of the original document, there is little possibility that the character directions are not arranged. Even though there is no user's setting regarding "character direction" with the printer driver, the characters of each page are reliably in an orthoscopic state. Further, even though the character drawing command is subjected to edition, such as rotation or the like, a correct direction is specified, and the characters on each page are reliably in an orthoscopic state.

Various kinds of processing are performed on the basis of the character command, commands regarding graphics or images (photos) are skipped, and the character drawing command is processed by arithmetic operation of only matrix information being not rasterized. The processing is easily performed as a whole, and a load is lightened, as compared with a case where rasterization is performed based on the character drawing command, or where a the characters on the output medium are read and processed.

Second Exemplary Embodiment

Device Configuration

Figure 9:
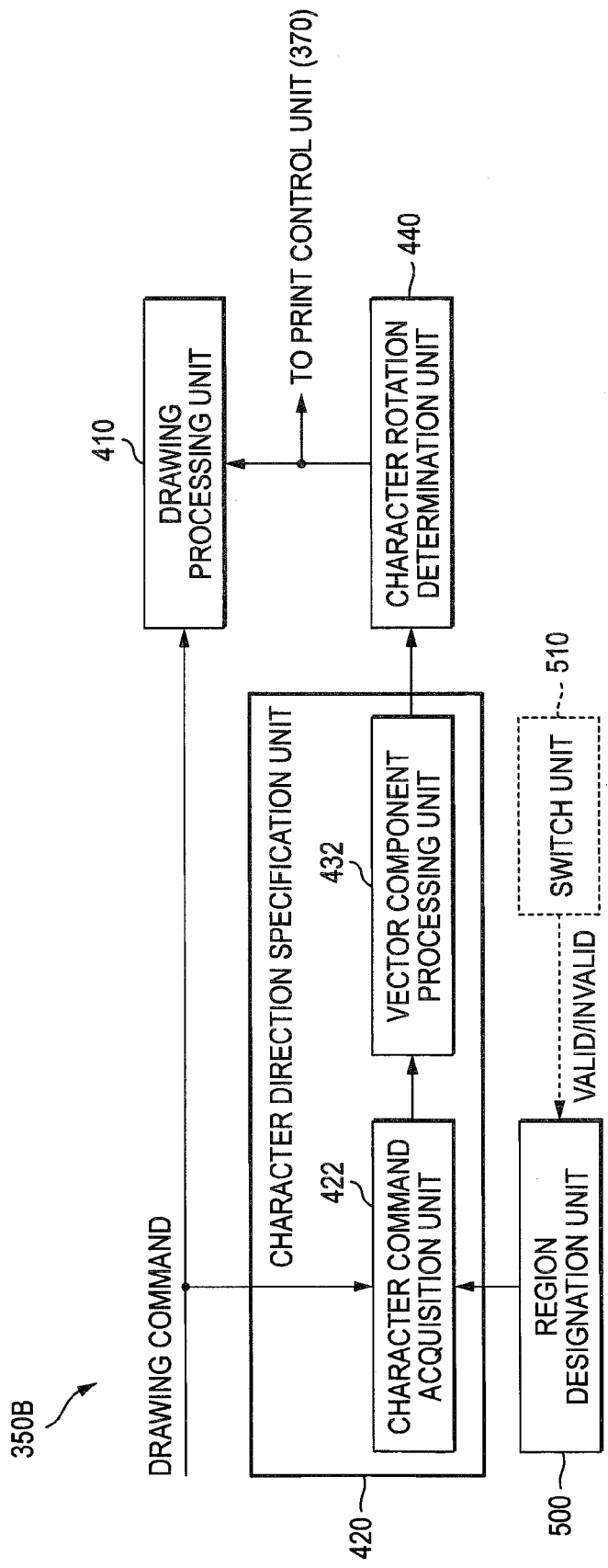
FIG. 9 is a diagram showing the configuration of an image processing unit of a second exemplary embodiment.

FIG. 9 is a diagram showing the configuration of an image processing unit 350B of a second exemplary embodiment. Note that an application example to the first exemplary embodiment (first configuration example) shown in FIG. 3A is shown, but an application may be made to the first exemplary embodiment (second configuration example) shown in FIG. 3B.

The image processing unit 350B of the second exemplary embodiment has a feature in that, in addition to the image processing unit 350A_1 of the first exemplary embodiment, a region designation unit 500 is provided. The region designation unit 500 receives designation of a processing-target region by the character direction specification unit 420, and notifies the character direction specification unit 420 (the character command acquisition unit 422) of the processing-target region. The character direction specification unit 420 does not designate the entire page as the processing-target region, and performs the same processing as the first exemplary embodiment on the characters in the processing-target region notified from the region designation unit 500.

As indicated by a dotted line in the drawing, a switch unit 510 may be provided to switch validation or invalidation of the region designation function by the region designation unit 500, thereby selectively using (switching) the entire page and a part of the page as the processing-target region according to the purposes.

[Region Designation Processing]

Figure 10:
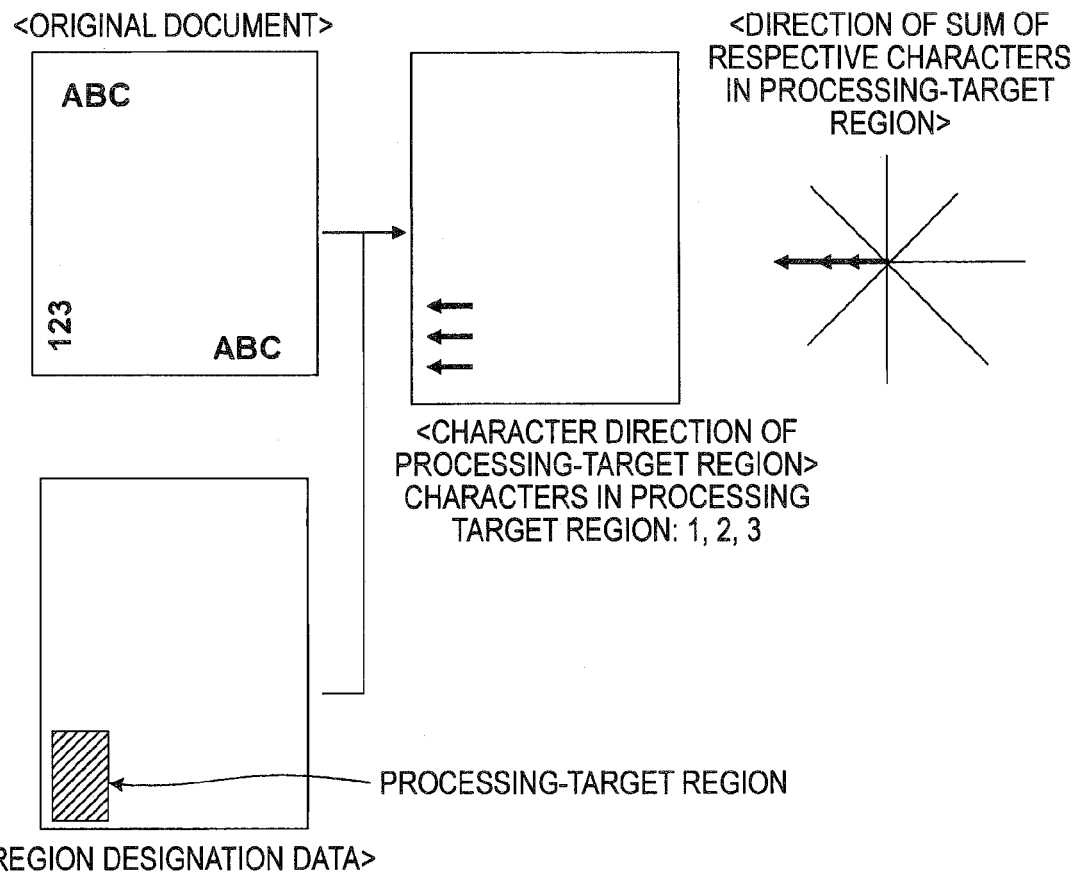
FIG. 10 is a diagram illustrating the basic operation of a region designation unit.

FIG. 10 is a diagram illustrating the basic operation of the region designation unit 500. The region designation unit 500 receives designation of the processing-target region with a mask region, a rectangular region, or the like in advance, and instructs the character direction specification unit 420 to set only characters in a feature region of a document (page) as a processing target. As the region designation means, as described below, PDL, a user interface screen, or the like is used.

Region Designation Processing

First Configuration Example

Figure 11A:
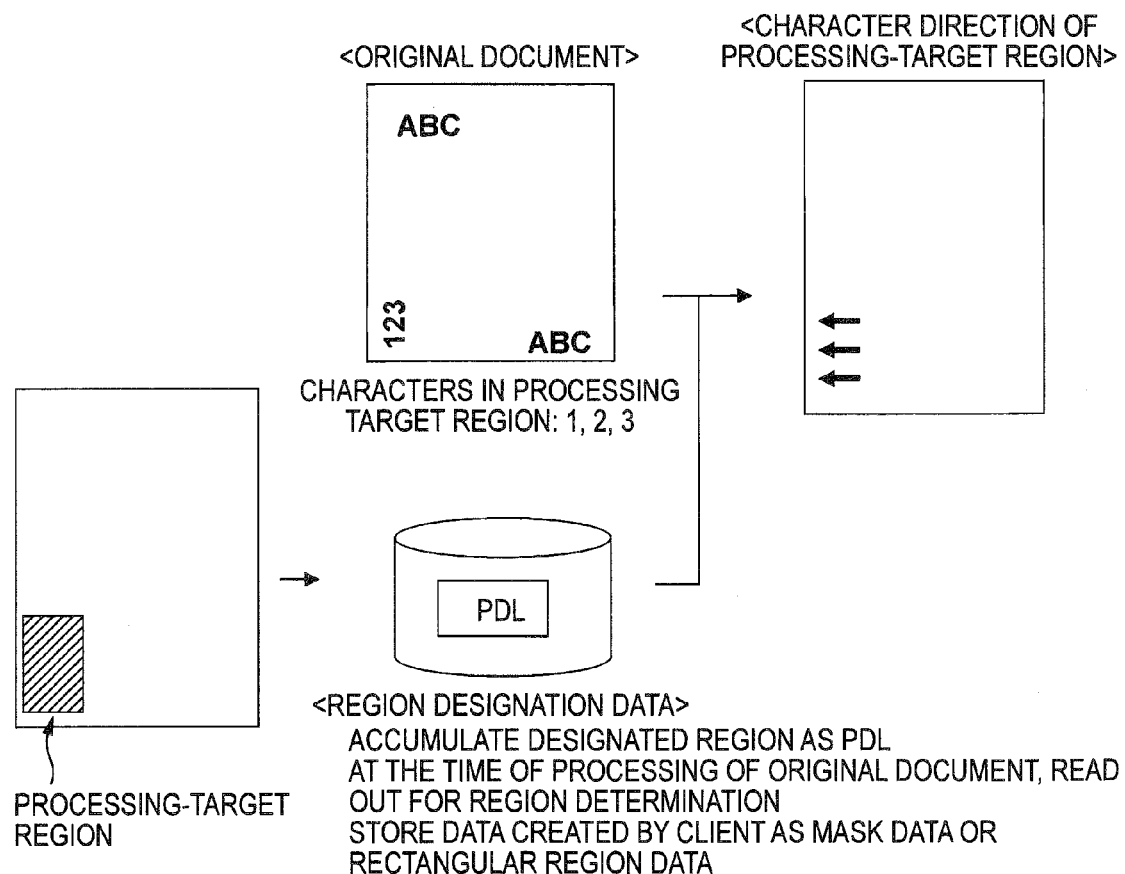
FIG. 11A is a diagram illustrating a first configuration example of the region designation unit and its operation.

FIG. 11A is a diagram illustrating a first configuration example of the region designation unit 500 and its operation. The region designation unit 500_1 of the first configuration example uses PDL as the region designation means. In this case, the region designation unit 500_1 accumulates a designated region as PDL, and at the time of processing of the original document, reads out the designated region for region determination.

Here, "accumulation of designated region as PDL" means that as a command representing a mask region or a rectangular region, data created by the host-side device 2 (client) is stored in the hard disk device 390.

Region Designation Processing

Second Configuration Example

Figure 11B:
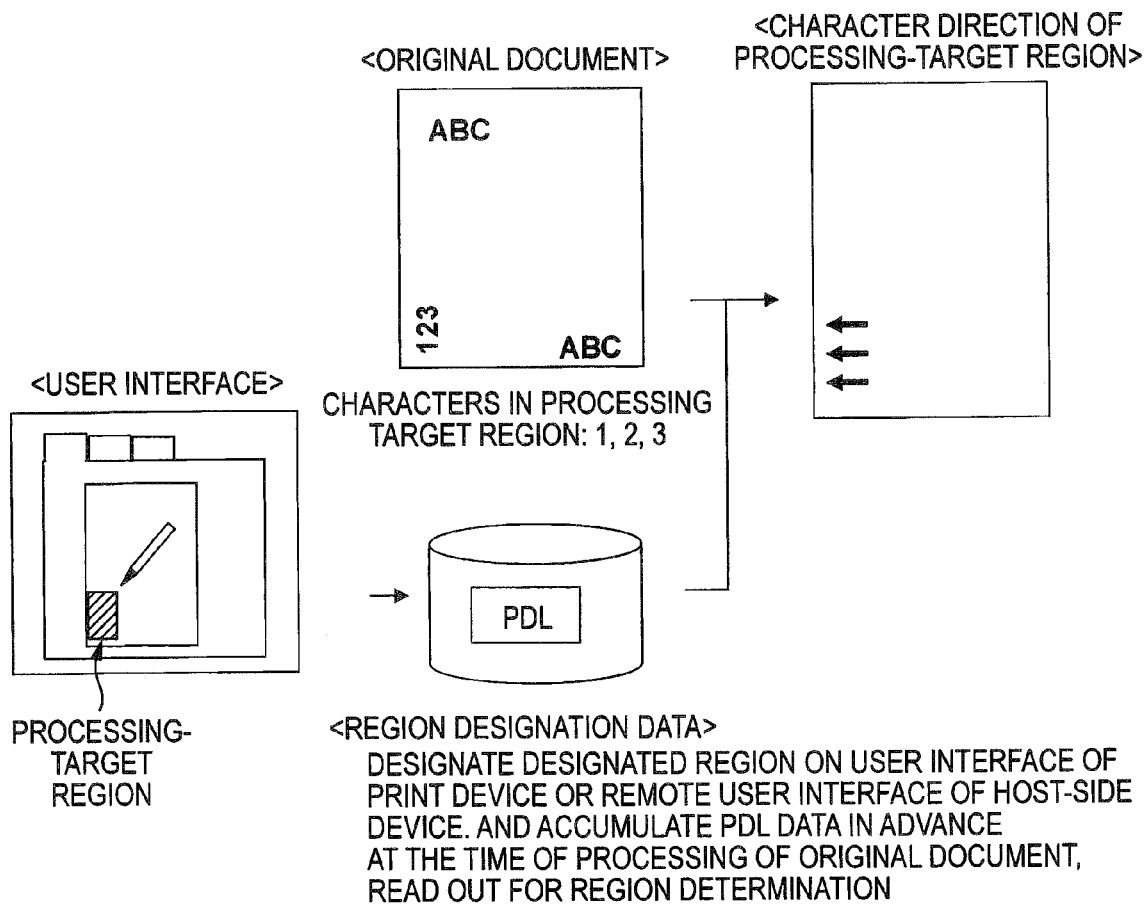
FIG. 11B is a diagram illustrating a second configuration example of the region designation unit and its operation.

FIG. 11B is a diagram illustrating a second configuration example of the region designation unit 500 and its operation. The region designation unit 500_2 of the second configuration example is a first example of an aspect in which a user interface screen is used as the region designation means. In the first example, the region designation unit 500_2 receives designation of the designated region on a user interface of the print device 3 or a remote user interface of the host-side device 2, and similarly to the first example, accumulates the designated region in the hard disk device 390 as PDL data in advance. Then, at the time of processing of the original document, relevant information is read out for region determination.

Region Designation Processing

Third Configuration Example

Figure 11C:
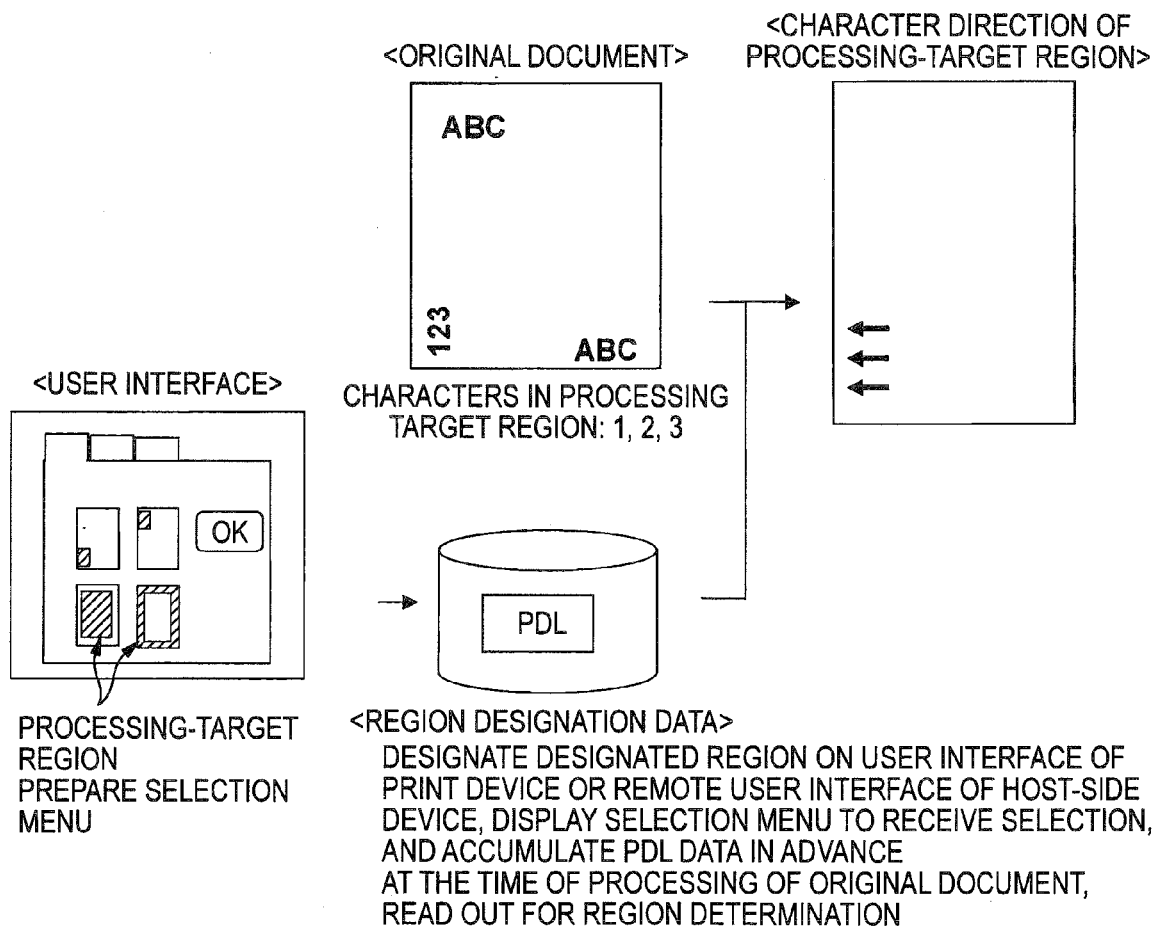
FIG. 11C is a diagram illustrating a third configuration example of the region designation unit and its operation.

FIG. 11C is a diagram illustrating a third configuration example of the region designation unit 500 and its operation. The region designation unit 500_3 of the third configuration example is a second example of an aspect in which a user interface screen is used as the region designation means. The second example is different from the first example (second configuration example) in that a selection menu screen of a designated region is displayed to receive a user's selection. Other parts are the same as those in the first example (second configuration example).

Processing Procedure

Second Exemplary Embodiment

Figure 12:
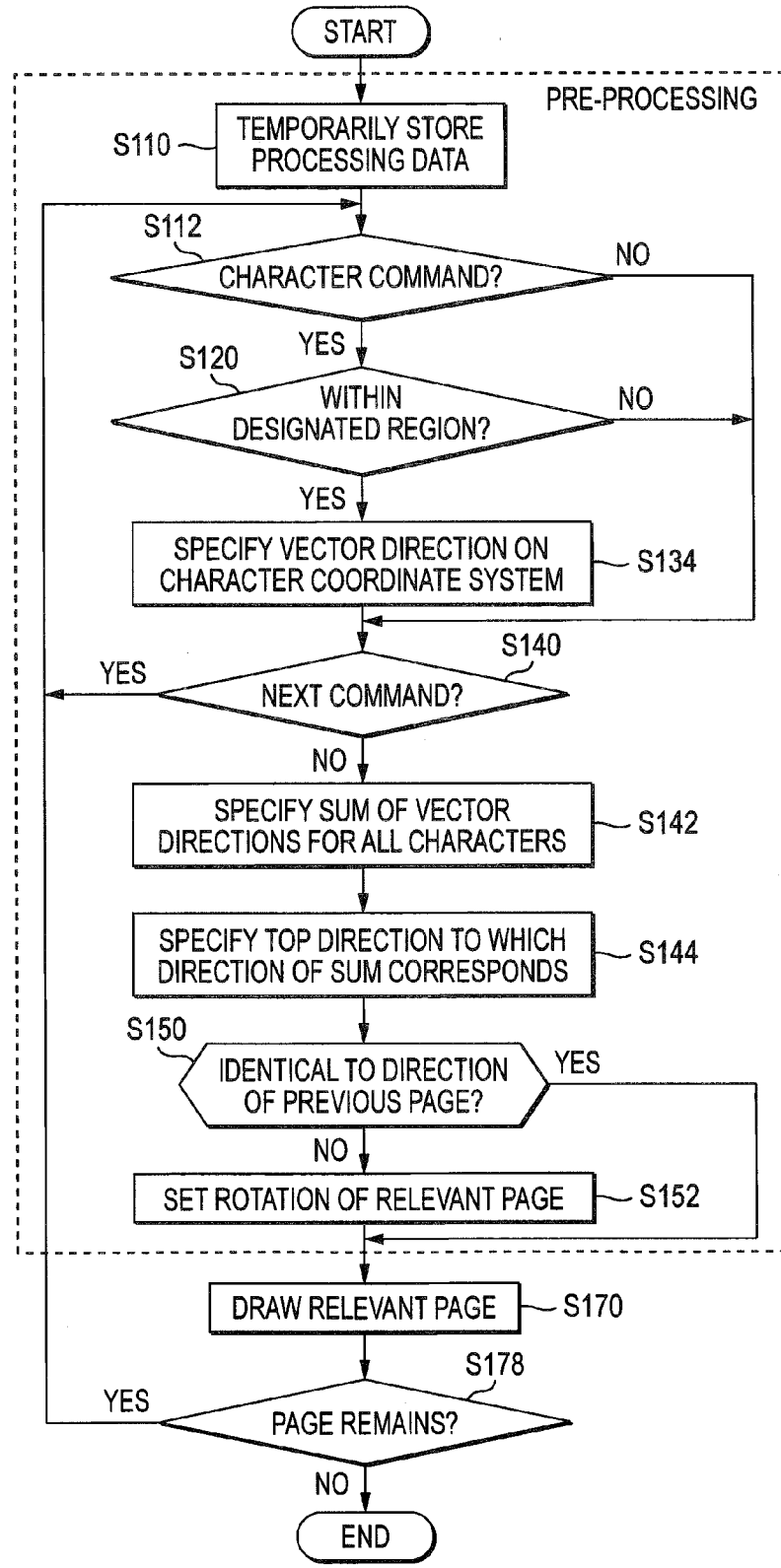
FIG. 12 is a flowchart illustrating the overall operation of the image processing unit of the second exemplary embodiment.

FIG. 12 is a flowchart illustrating the overall operation of the image processing unit 350B of the second exemplary embodiment.

The second exemplary embodiment is different from the first exemplary embodiment in that, when the region designation unit 500 receives designation of the processing-target region, the character direction specification unit 420 follows the instruction. Other parts are the same as those in the first exemplary embodiment.

For this reason, in the second exemplary embodiment, character vector processing unit determines whether or not a character command is within the designated region received by the region designation unit 500 (S120). Then, only for each of character commands within the designated region (S120—YES), in the same manner as described above, the vector component processing unit 432 or the matrix component processing unit 434 specifies the vector direction of the character coordinate system (S134). Subsequent processing is the same as in the first exemplary embodiment.

Third Exemplary Embodiment

Device Configuration

Figure 13:
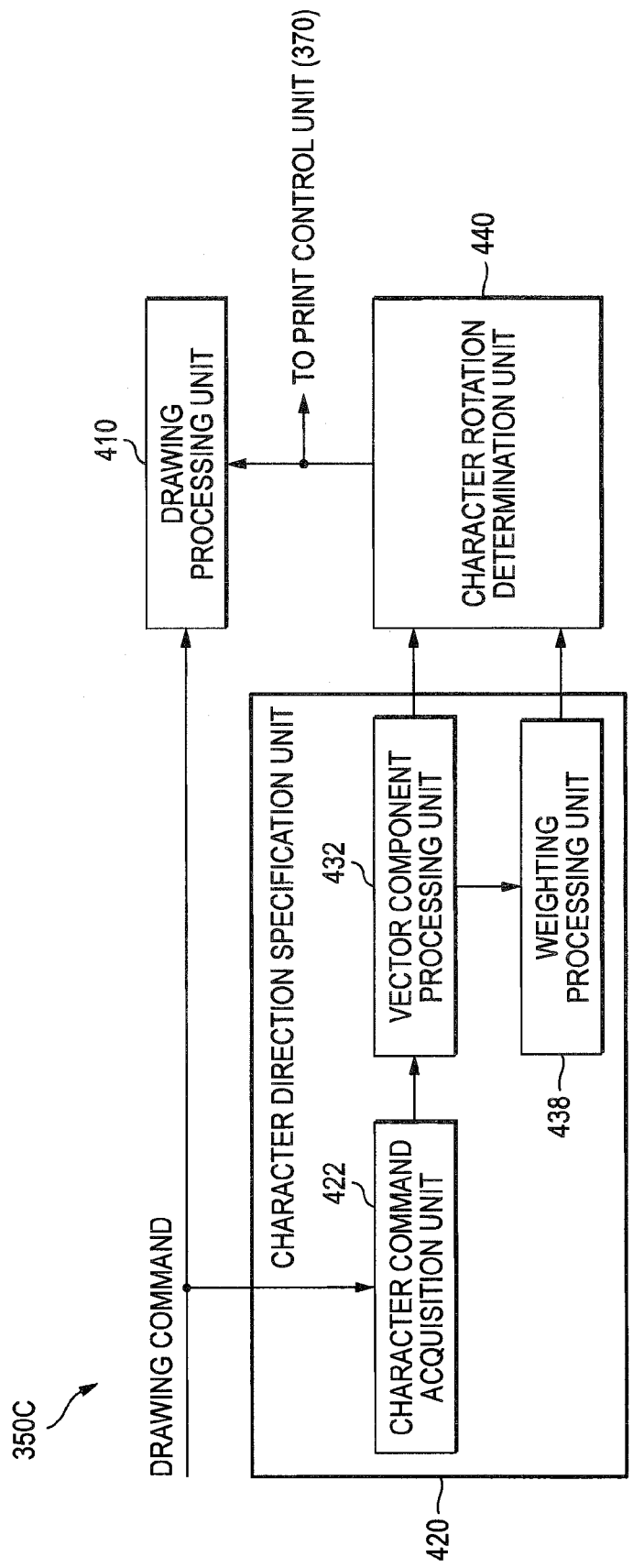
FIG. 13 is a diagram showing the configuration of an image processing unit of a third exemplary embodiment.

FIG. 13 is a diagram showing the configuration of an image processing unit 350C of a third exemplary embodiment. Note that an application example to the first exemplary embodiment (first configuration example) shown in FIG. 3A is shown, but an application may be made to the first exemplary embodiment (second configuration example) or the second exemplary embodiment.

The image processing unit 350C of the third exemplary embodiment has a feature in that, in addition to the image processing unit 350A_1 of the first exemplary embodiment, a character direction specification unit 420 includes a weighting processing unit 438.

In the case of a command designating a continuous character string, the vector component processing unit 432 or the matrix component processing unit 434 specifies the vector direction for one character (for example, first character) in the continuous character string, and delivers the result to the weighting processing unit 438. The weighting processing unit 438 weights "the vector direction for the first character" with the number of characters on the basis of the command designating a continuous character string, thereby specifying the vector directions for a continuous character string.

[Weighting Processing]

FIG. 14 is a diagram illustrating the operation of the weighting processing unit 438. In the case of a command designating a continuous character string, the weighting processing unit 438 calculates the vector direction for the first character, and weights other characters by the number of characters.

For example, a command is defined as shown in (1) of FIG. 14. In this example, "FONT" representing a character drawing command, an X coordinate "X" and a Y coordinate "Y" defining the drawing position, and a drawing character code "CHAR" are defined. Note that the character code "CHAR" is expressed in hexadecimal of the ASCII code.

When a character string is designated continuously, multiple character codes are described in the portion of the character code. In this case, the X coordinate "X" and the Y coordinate "Y" defining the drawing position represent the drawing intension of the first character.

An example of a command continuously designating a character string is shown in (2) of FIG. 14. In this example, "FONT 100 200 41 42 43" is shown, and since "41" is a character "A", "42" is a character "B", and "43" is a character "C", thus, this command indicates that "ABC" is drawn at the position of the coordinate (100,200).

In this case, first, since it is known that the FONT command has three characters, the vector component processing unit 432 determines only the character "A". The vector component processing unit 432 specifies the vector as (0,1) with the determination of the character "A", and notifies the result to the weighting processing unit 438. Since it is known that the FONT command has three characters, the weighting processing unit 438 triples the vector (0,1) notified from the vector component processing unit 432 and determined with the character "A".

Processing Procedure

Third Exemplary Embodiment

Figure 15:
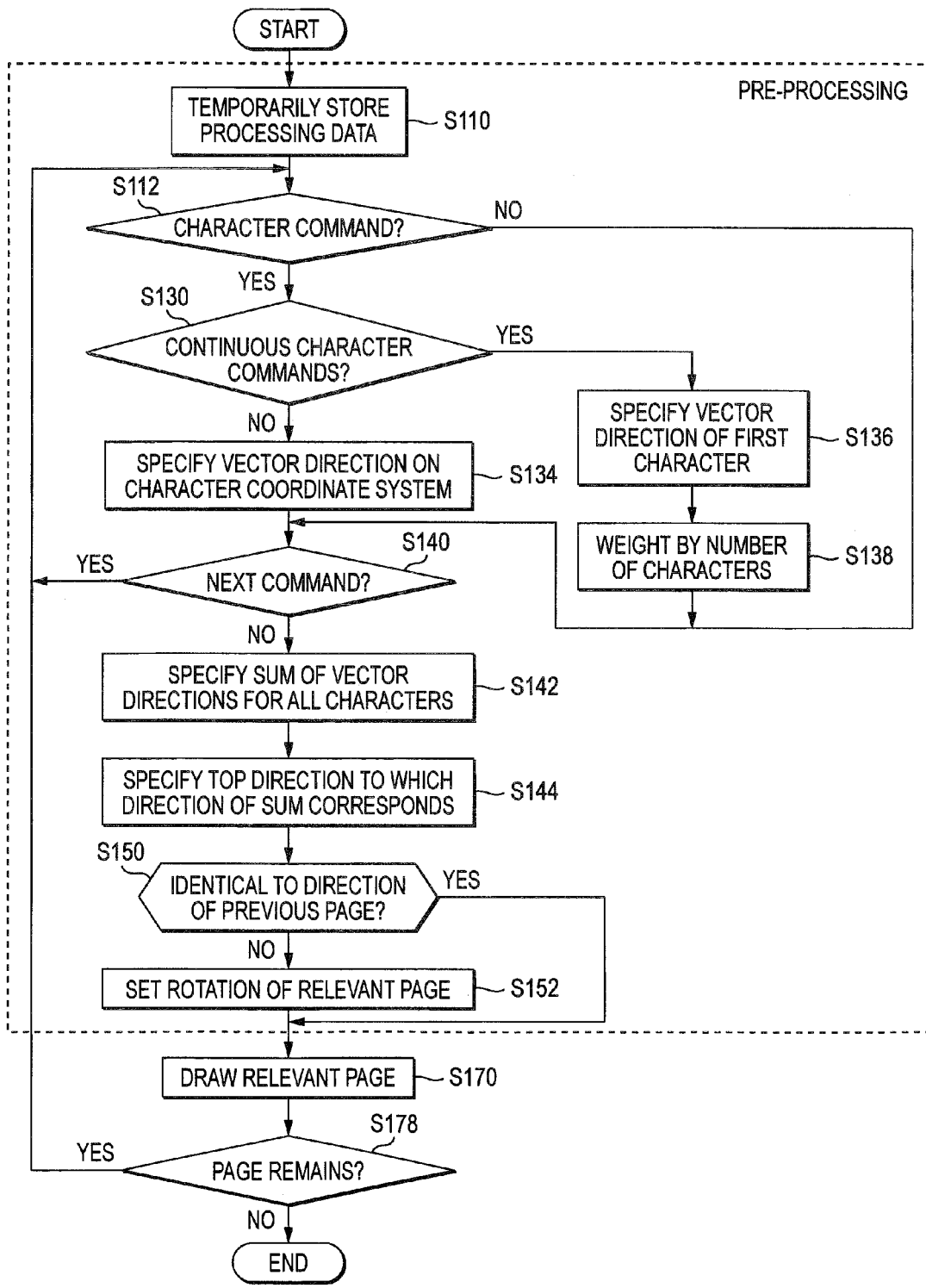
FIG. 15 is a flowchart illustrating the overall operation of the image processing unit of the third exemplary embodiment.

FIG. 15 is a flowchart illustrating the overall operation of the image processing unit 350C of the third exemplary embodiment.

The third exemplary embodiment is different from the first exemplary embodiment in that, in the case of a command continuously designating a character string, the vector direction is specified only for the first character, and other characters are weighted by the number of characters. Other parts are the same as those in the first exemplary embodiment.

For this reason, in the third exemplary embodiment, the character direction specification unit 420 first determines whether or not a character command is a command (called a continuous character command) continuously defining a character string (S130). If the character command is not a continuous character command, each character is processed in the same manner as in the first exemplary embodiment (S130—NO).

If the character command is a continuous character command, the vector component processing unit 432 or the matrix component processing unit 434 specifies the vector direction for only the first character of the continuous characters, and delivers the result to the weighting processing unit 438 (S130—YES, S136). The weighting processing unit 438 weights "the vector direction for the first character" by the number of characters, that is, the continuous character string is weighted in the vector direction by the number of characters, thereby specifying the vector directions for the continuous character string (S138). Subsequent processing is the same as in the first exemplary embodiment.

Fourth Exemplary Embodiment

Device Configuration

Figure 16:
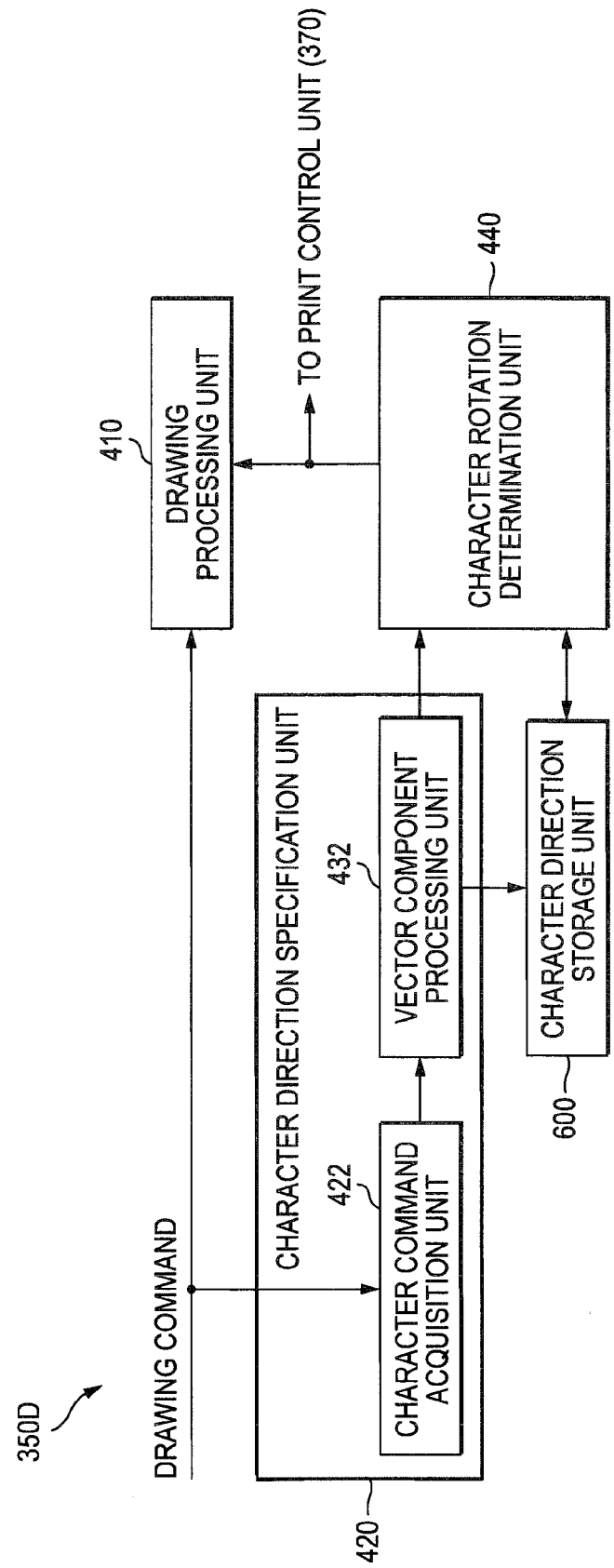
FIG. 16 is a diagram showing the configuration of an image processing unit of a fourth exemplary embodiment.

FIG. 16 is a diagram showing the configuration of an image processing unit 350D of a fourth exemplary embodiment. Note that an application example to the first exemplary embodiment (first configuration example) shown in FIG. 3A is shown, but an application may be made to the first exemplary embodiment (second configuration example), the second exemplary embodiment, or the third exemplary embodiment.

The fourth exemplary embodiment is an application example at the time of output of accumulated documents where when receiving an instruction for output processing from the host-side device 2, the print device 3 does not immediately perform the print processing but performs a print processing in an "accumulation print" mode using a storage medium (hard disk device 390), such as private print or the like.

An image processing unit 350D of the fourth exemplary embodiment has a feature in that, in addition to the image processing unit 350A_1 of the first exemplary embodiment, a character direction storage unit 600 is provided. When receiving an instruction regarding "accumulation print" from the host-side device 2, the print device 3 temporarily stores processed data in the hard disk device 390, and then holds the processing until an output instruction is made.

At this time, desirably, "processed data" stored in the hard disk device 390 is not received print data (PDL data) as it is, but data (raster image) in a rasterized state by the drawing processing unit 410. This is because time until the sheet is discharged is shortened, as compared with a case where rendering is performed after an output instruction is received.

When "processed data" is stored in the hard disk device 390, the character direction specification unit 420 specifies the vector direction (particularly, the direction of the entire processing-target region). The character direction storage unit 600 stores information regarding the vector direction specified by the character direction specification unit 420 in a corresponding area of the hard disk device 390 in association with the processing-target region of processed data to be accumulated. When the entire page is set as the processing-target region, the vector direction may be associated with the raster image of the entire page.

[Re-Drawing Processing]

Figure 17:
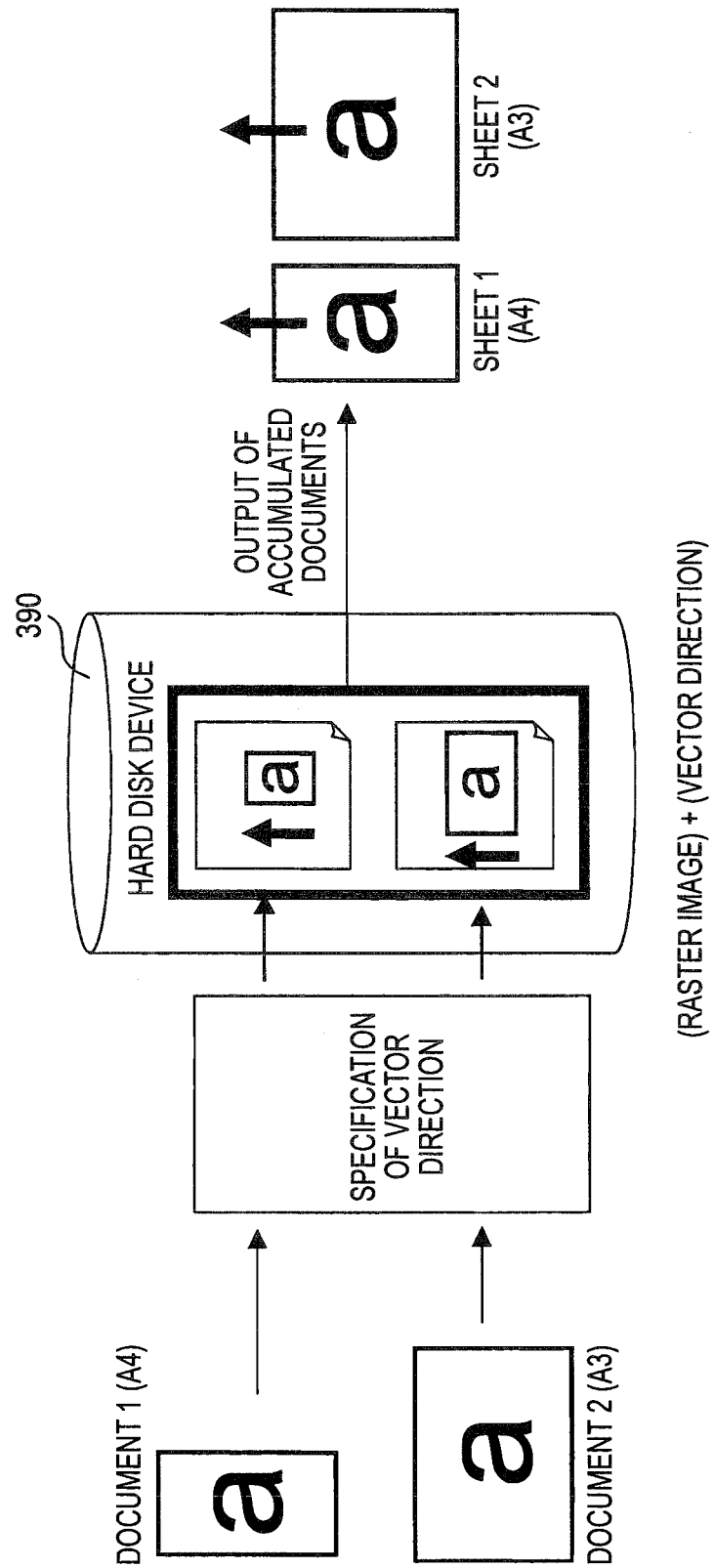
FIG. 17 is a diagram illustrating a re-drawing processing of a character using a character direction storage unit.

FIG. 17 is a diagram illustrating a re-drawing processing of characters using the character direction storage unit 600.

For example, it is assumed that with regard to an A4-size document 1 as a portrait image, and an A3-size document 2 as a landscape image, a print instruction in an "accumulation prints" mode is made.

The print device 3 that receives the instruction regarding the output processing stores (accumulates) the raster image rendered by the drawing processing unit 410 in the hard disk device 390. The character direction specification unit 420 specifies the direction of the entire processing-target region, and the character direction storage unit 600 stores information regarding the vector direction in association with the raster image.

Thereafter, when receiving an instruction to output the document 1 and the document 2 together, the print device 3 is configured such that with regard to the output result including the document 1 and the document 2, the characters on any document (page) are in an orthoscopic state on the basis of the relation between the vector directions of the document 1 and the document 2.

Processing Procedure

Fourth Exemplary Embodiment

Figure 18:
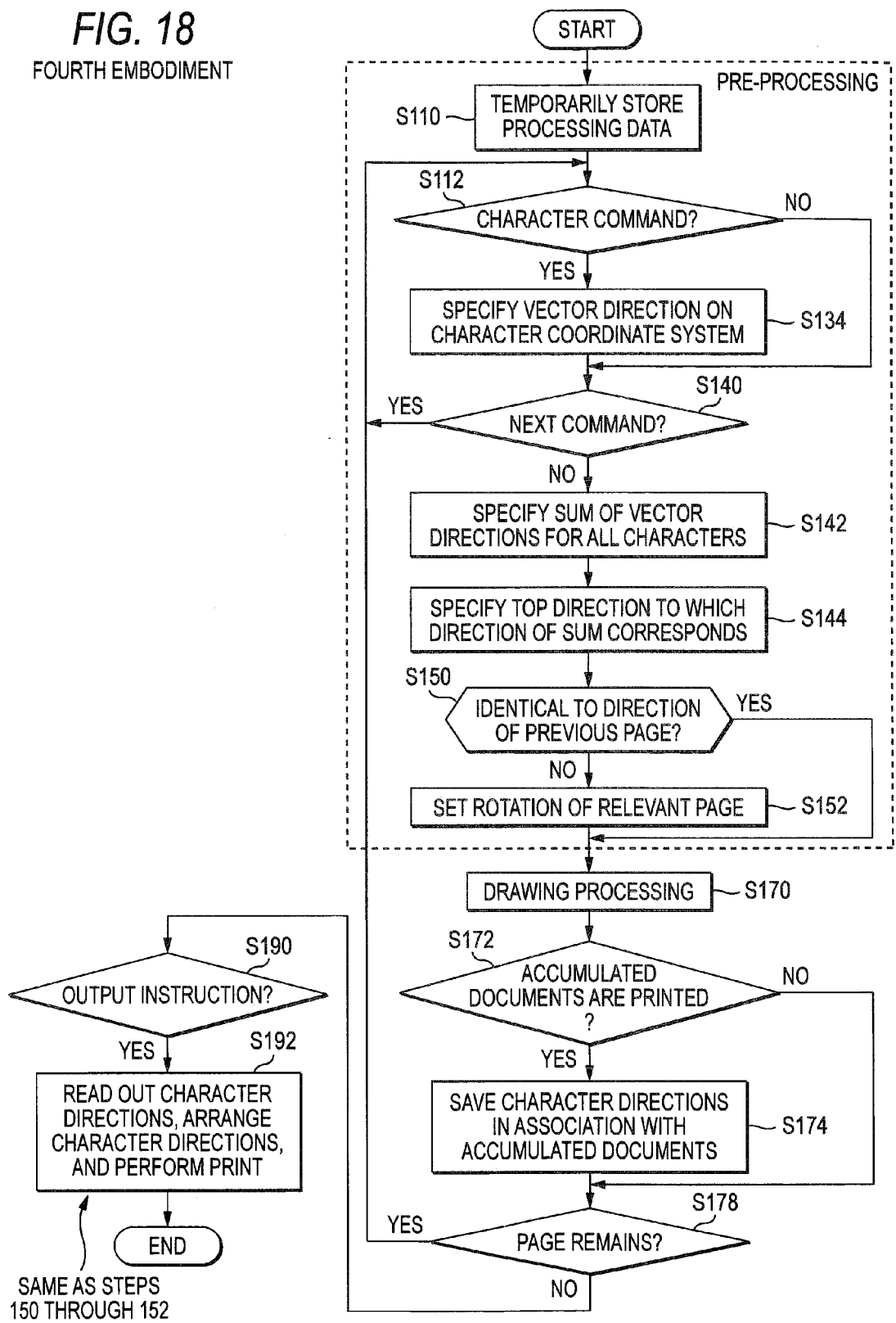
FIG. 18 is a flowchart illustrating the overall operation of an image processing unit of a fourth exemplary embodiment.

FIG. 18 is a flowchart illustrating the overall operation of the image processing unit 350D of the fourth exemplary embodiment.

The fourth exemplary embodiment is different from the first exemplary embodiment in that, in the case of the print instruction in the "accumulation print" mode, the direction of the entire processing-target region is specified, information regarding the vector direction is stored in association with processed data (raster image), and when the output instruction is received, the information regarding the vector direction is utilized. Also, this exemplary embodiment is different from the first exemplary embodiment in that all printed documents are stored in the hard disk device 390 as raster images for a predetermined period of time, and when an instruction to re-output a printed document is received, the information regarding the vector direction is utilized. Other parts are the same as those in the first exemplary embodiment. Hereinafter, for example, an "accumulation print" mode will be described.

In the fourth exemplary embodiment, after the drawing processing unit 410 draws the relevant page (S170), the print control unit 370 determines whether or not the instruction is the print instruction in the "accumulation print" mode (S172) If not the print instruction in the "accumulation print" mode, the print control unit 370 immediately instructs the print processing on the sheet as usual (S172—NO).

In the case of the print instruction in the "accumulation print" mode, the print control unit 370 instructs the character direction storage unit 600 to store the processing result of the character direction specification unit 420 in association with the processing result of the drawing processing unit 410 (S172—YES). The character direction storage unit 600 that receives this instruction stores information regarding the direction of the entire processing-target region specified by the character direction specification unit 420 in association with the raster image generated by the drawing processing unit 410 (S174). The drawing processing unit 410 stores (accumulates) the generated raster image in the hard disk device 390 (S186).

When receiving an instruction to output multiple documents stored in the hard disk device 390 together, (S190—YES), the print control unit 370 performs the same processing as Steps S150 through S152 in the first exemplary embodiment on the basis of the relation between the vector directions of the respective documents stored in the character direction storage unit 600, such that the drawing directions of the characters of the respective pages are arranged, specifically, such that the characters on any document (page) as the output result including the respective documents are in an orthoscopic state (S192).

With regard to the structure of the fourth exemplary embodiment, the structure of the first exemplary embodiment is applied as pre-processing of the output processing in the "accumulation print" mode. For the arrangement at the time of the output processing, the structure of the first exemplary embodiment is utilized. The specification processing of the vector direction of each document is performed while processed data (raster image) of the document is being stored. Therefore, there is little influence on the processing speed of the pre-processing for specification of the vector direction of the document.

Fifth Exemplary Embodiment

Device Configuration

Figure 19A:
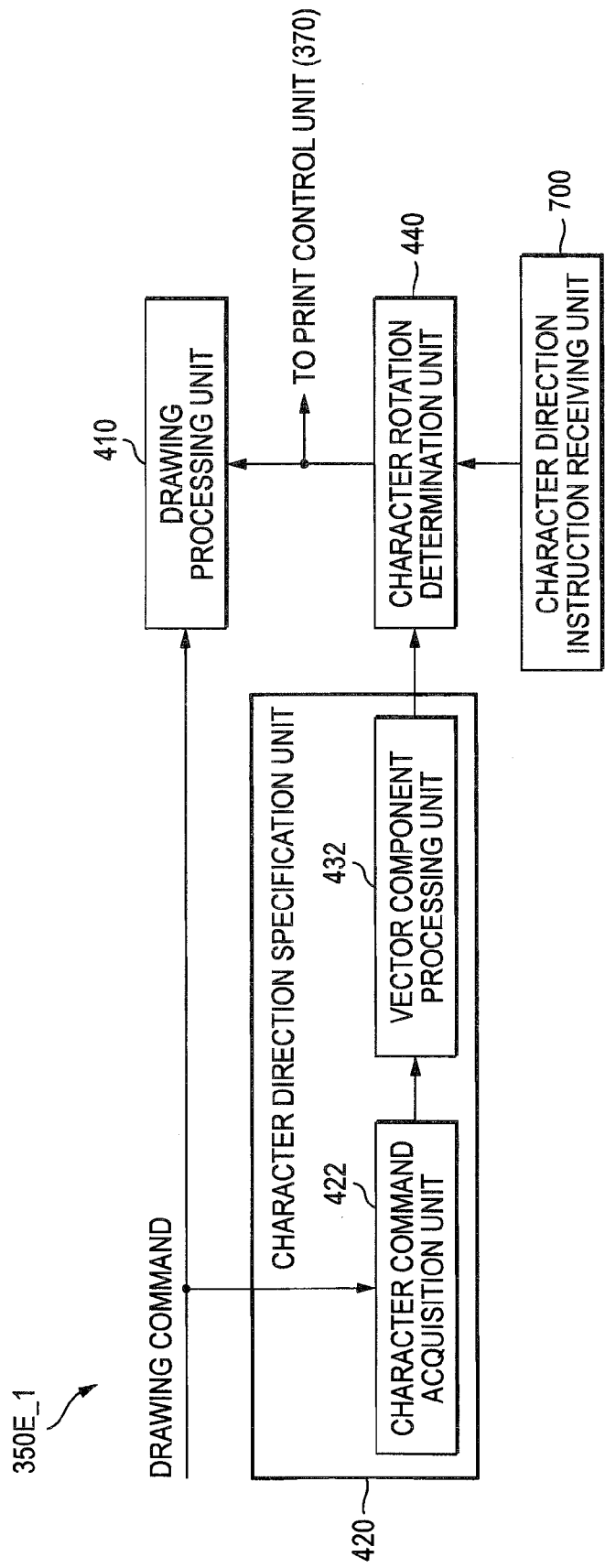
FIG. 19A is a diagram showing the configuration of an image processing unit of a fifth exemplary embodiment (first configuration example)

FIGS. 19A through 19B are diagrams illustrating the configuration of an image processing unit 350E of a fifth exemplary embodiment. FIG. 19A shows an image processing unit 350E_1 of a first example, and FIG. 19B shows an image processing unit 350E_2 of a second example. Note that an application example to the first exemplary embodiment (first configuration example) shown in FIG. 3A is shown, but an application may be made to the first exemplary embodiment (second configuration example), or the second through fourth exemplary embodiments.

The image processing units 350E_1 and 350E_2 of the fifth exemplary embodiment has a feature in that, in addition to the image processing unit 350A_1 of the first exemplary embodiment, a character direction instruction receiving unit 700 is provided. The image processing unit 350E_2 of the second example shown in FIG. 19B is different from the image processing unit 350E_1 of the first example in that the character direction specification unit 420 has a character drawing direction comparison unit 450.

The character drawing direction comparison unit 450 determines whether or not the character drawing state of each page (entire page or specific region) when the vector direction specification processing by the character direction specification unit 420 is applied is consistent with the character drawing state of each page (entire page or specific region) when processing is performed according to the user's settings. In particular, the character drawing direction comparison unit 450 determines whether or not the character drawing direction over the entire page or in the specific region is arranged between the pages. The image processing unit 350E_2 may include a character direction storage unit 452 which is the same as the character direction storage unit 600.

The fifth exemplary embodiment is an application example when print data which is transmitted from the host-side device 2 to the print device 3 is appended with information specifying "character direction". The character direction instruction receiving unit 700 receives the user's setting regarding "character direction" included in print data, and notifies this information to the drawing processing unit 410 and the character direction specification unit 420. The character direction specification unit 420 switches processing according to presence/absence of the user's setting regarding "character direction".

For example, if the first exemplary embodiment is applied to a case where there is the user's setting regarding "character direction" with the printer driver, processing is performed such that the characters on each page are in an orthoscopic state, regardless of "character direction" of the user's setting. With regard to this point, when "character direction" of the user's setting is erroneously designated, the characters on each page are reliably in an orthoscopic state, but when the user intentionally designates such that "character direction" is different from "orthoscopic state", actually, processing is not performed as intended.

Taking this point into consideration, in the fifth exemplary embodiment, when there is the user's setting regarding "character direction", print processing is performed according to the instruction preferentially (in the case of the image processing unit 350E_1 of the first example), or when "character direction" of the user's setting is different from "character direction" of the result at the time of application of the first exemplary embodiment, print processing is performed after the user has confirmed (in the case of the image processing unit 350E_2 of the second example).

[Character Drawing Direction Comparison Processing]

Figure 19C:
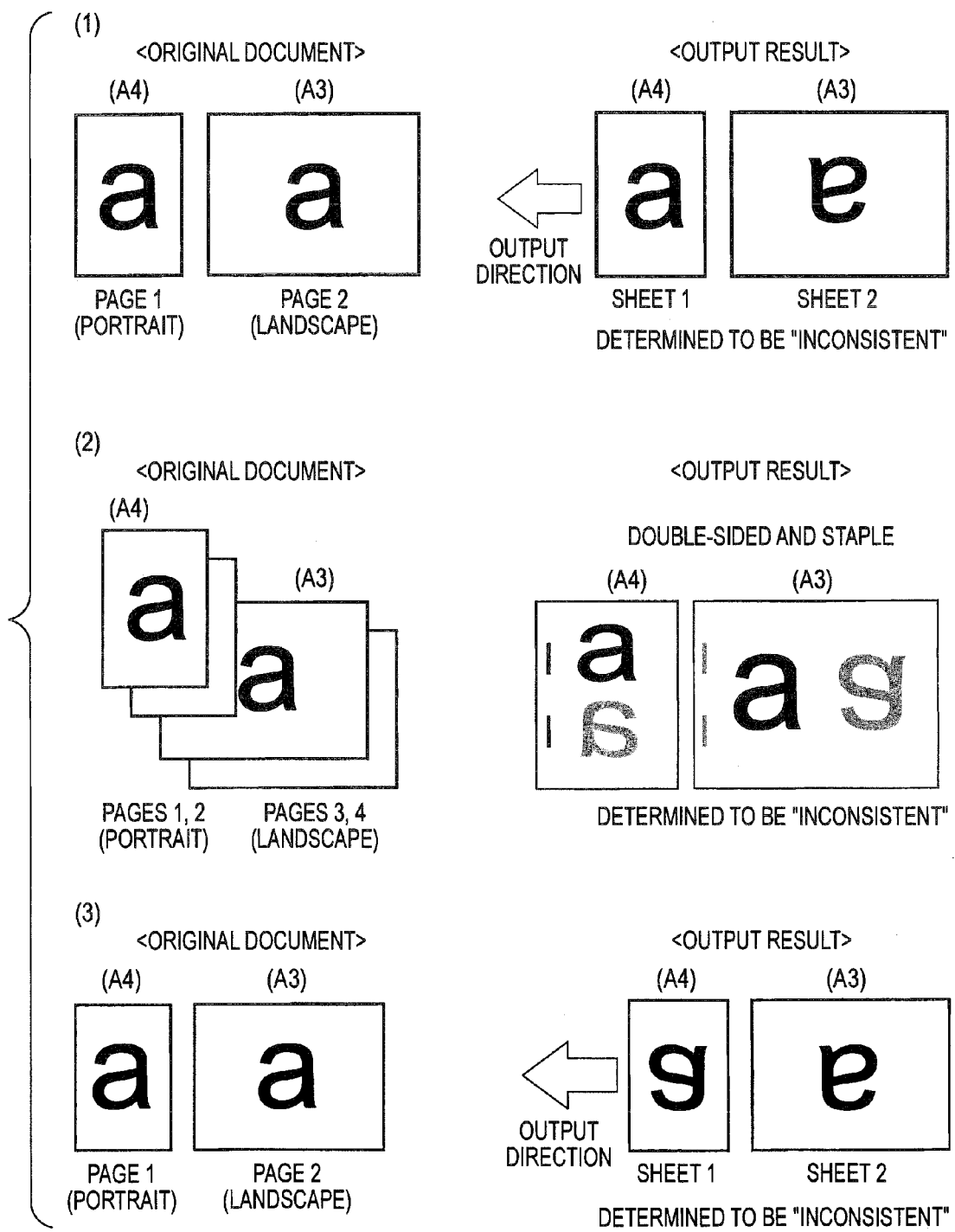
FIG. 19C is a diagram illustrating the operation of a character drawing direction comparison unit.

FIG. 19C is a diagram illustrating the operation of the character drawing direction comparison unit 450. With regard to the character drawing state of the output result when the vector direction specification processing by the character direction specification unit 420 is applied, on any page, the characters are always in an orthoscopic state. In contrast, the character drawing state of the output result when processing is performed according to the user's setting may vary in various ways in accordance with the approaches regarding the drawing processing of the drawing processing unit 410 in the print device 3, the sheet size and transport mode (horizontal feed or vertical feed), rear surface discharge (discharge in a reversed state), a difference between one-sided print and double-sided print, presence/absence of finishing (post-processing), and the like. As shown in (1) and (2) of FIG. 19C, which is the same as the state shown in FIG. 2, the character drawing direction may not be arranged between the pages, or as shown in (3) of FIG. 19C, even though the character drawing direction is arranged, the characters may be arranged in an inverted state and output.

The character drawing direction comparison unit 450 determines whether or not the character drawing direction of the entire page or specific region when processing is performed in accordance with the user's setting is arranged between the pages. When the character drawing direction is inconsistent between the pages, it may be determined that there is inconsistency with the processing result by the character direction specification unit 420. Therefore, the character drawing direction comparison unit 450 may use the determination processing result regarding "whether or not be identical to the direction of the previous page" by the character rotation determination unit 440. Specifically, the character drawing direction comparison unit 450 may determine to be "inconsistency" when there is a page whose character drawing direction is inconsistent with other pages.

With regard to the character drawing direction of the entire page or specific region when processing is performed in accordance with the user's setting, on all the pages, when the characters are in an inverted state, actually, a difference from the processing result by the character direction specification unit 420 is not regarded as to be "inconsistent". This is because the structure of this exemplary embodiment is based on a technical idea that when the character drawing direction between the pages is not arranged, the rotation processing is performed so as to arrange the character drawing direction between the pages, but when the character drawing direction between the pages is arranged in an inverted state, the rotation processing is not essentially performed.

When it is determined that there is "inconsistency" between the processing result based on the user's setting and the processing result by the character direction specification unit 420, the character drawing direction comparison unit 450 sends relevant information to the host-side device 2 and also notifies the user of the relevant information. In this case, a structure where the schematic views of both drawing states are compared and displayed may be adopted.

Subsequently, when a way to process using the vector direction specification processing of the first exemplary embodiment is selected, similarly to the character direction storage unit 600 of the fourth exemplary embodiment, the character direction storage unit 452 desirably store information regarding the direction of the entire processing-target region specified by the character direction specification unit 420 in association with the pages of print data so as to make a series of processing by the character direction specification unit 420 the most.

Processing Procedure

Fifth Exemplary Embodiment (First Example)

Figure 20A:
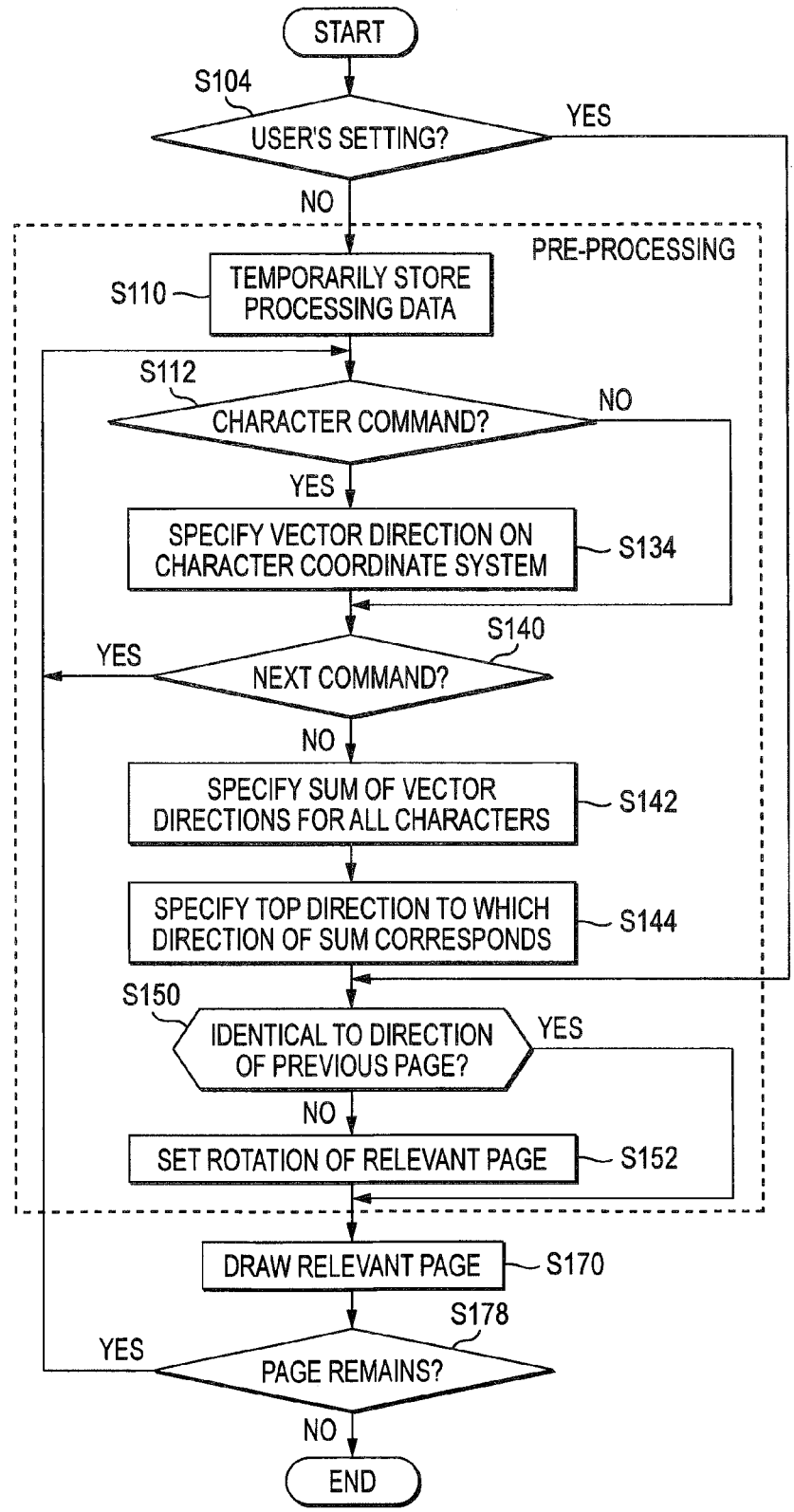
FIG. 20A is a flowchart (first example) illustrating the overall operation of the image processing unit of the fifth exemplary embodiment.

FIG. 20A is a flowchart (first example) illustrating the overall operation of the image processing unit 350E of the fifth exemplary embodiment. In the first example of FIG. 20A, when there is the user's setting regarding "character direction", processing is performed in accordance with the instruction preferentially. In a second example of FIG. 20B, in the even that there is the user's setting regarding "character direction", if the character drawing state of the output result when processing is performed in accordance with the instruction is different from "character direction" from the result when the vector direction specification processing of the first exemplary embodiment is applied, print processing is performed after the user has confirmed.

The fifth exemplary embodiment is different from the first exemplary embodiment in that processing is switched in accordance with presence/absence of the user's setting regarding "character direction". Other parts are the same as those in the first exemplary embodiment. In particular, the fifth exemplary embodiment (first example) is different from a second example described below in that, when there is the user's setting, processing is performed in accordance with this instruction.

For this reason, in the fifth exemplary embodiment (first example), the character direction instruction receiving unit 700 determines whether or not there is the user's setting regarding "character direction" in print data (S104). When there is the user's setting (S104—YES), the character direction instruction receiving unit 700 extracts the setting information, delivers the setting information to the drawing processing unit 410, and inhibits the character direction specification unit 420 to carry out the vector direction specification processing of the first exemplary embodiment (S110 through S144). The character rotation determination unit 440 determines rotation/unrotation in accordance with the user's setting (S150). When there is no user's setting, the character direction instruction receiving unit 700 permits the vector direction specification processing of the first exemplary embodiment (S104—NO).

Thus, in the fifth exemplary embodiment (first example), when the host-side device 2 (client) can discriminate and designate the character top direction, the vector direction specification processing of the first exemplary embodiment is skipped. Regardless of whether or not the client (user) can accurately determine the actual drawing direction of the original document, the result in a state according to "intention" designated by the user is obtained.

Processing Procedure

Fifth Exemplary Embodiment (Second Example)

Figure 20B:
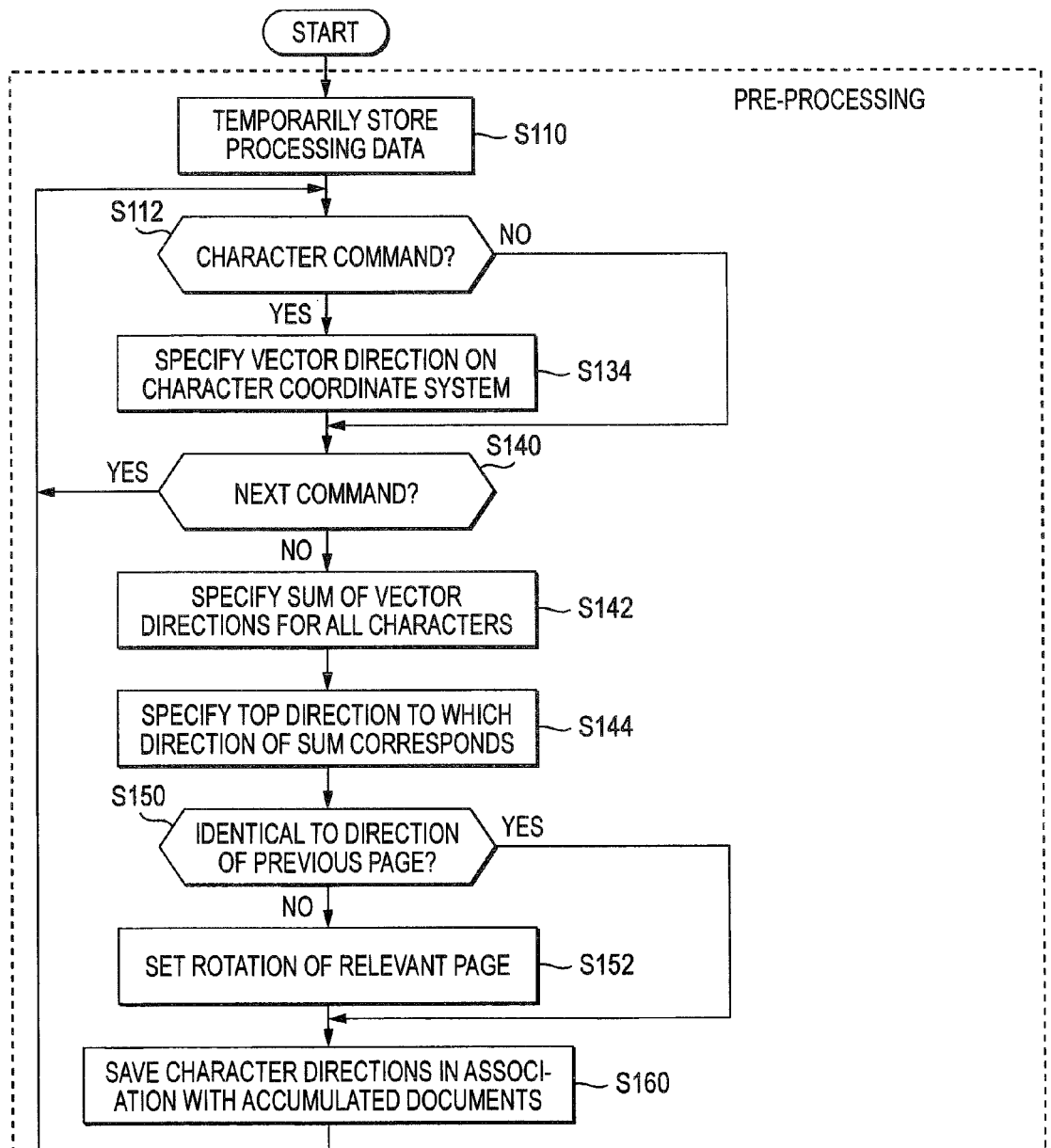
FIG. 20B is a flowchart (second example) illustrating the overall operation of the image processing unit of the fifth exemplary embodiment.

FIG. 20B is a flowchart (second example) illustrating the overall operation of the image processing unit 350E of the fifth exemplary embodiment. In the second example of FIG. 20B, in the even that there is the user's setting regarding "character direction", if the character drawing state of the output result when processing is performed in accordance with the instruction is different from "character direction" from the result when the vector direction specification processing of the first exemplary embodiment is applied, print processing is performed after the user has confirmed.

In the fifth exemplary embodiment (second example), even though there is the user's setting, the vector direction specification processing of the first exemplary embodiment is executed, it is determined whether or not the character drawing state of the output result at that time is consistent with the character drawing state of the output result when processing is performed in accordance with the user's setting, and if inconsistent, print processing is performed after the user has confirmed.

For this reason, in the fifth exemplary embodiment (second example), after the character direction specification unit 420 has completed pre-processing (vector direction specification processing), and before the drawing processing (S170) by the drawing processing unit 410, the character direction storage unit 452 stores information regarding the direction of the entire processing-target region specified by the character direction specification unit 420 in association with the pages of print data (S160).

The character direction instruction receiving unit 700 determines whether or not there is the user's setting regarding "character direction" in print data (S162). When there is the user's setting, the character direction instruction receiving unit 700 extracts the setting information, delivers the setting information to the drawing processing unit 410, and instructs the character drawing direction comparison unit 450 of the character direction specification unit 420 to compare the character drawing state of the output result at that time with the character drawing state of the output result when processing is performed in accordance with the user's setting.

The character drawing direction comparison unit 450 determines whether or not there is a page whose character drawing direction is inconsistent with other pages, using the determination processing result of "whether or not be identical to the direction of the previous page" by the character rotation determination unit 440 (S164).

When it is determined that the processing result according to the user's setting is "consistent" with the processing result by the character direction specification unit 420 (S164—YES), the character drawing direction comparison unit 450 continues the processing as it is. When it is determined that there is "inconsistency" between the processing result according to the user's setting and the processing result by the character direction specification unit 420 (S164—NO), the character drawing direction comparison unit 450 notifies the host-side device 2 of relevant information, and waits for an instruction to execute an output processing (S166).

If the user's setting has preference (S166—YES), that is, when an instruction to perform processing according to the user's setting is received, the print control unit 370 controls such that the print processing is performed in accordance with the user's setting (S168). When an instruction to perform processing to which the vector direction specification processing of the first exemplary embodiment is applied is received (S166—NO), the print control unit 370 performs the same processing as Steps S150 through S152 on the basis of the relation between the vector directions of the respective documents stored in the character direction storage unit 452 of the character drawing direction comparison unit 450, such that on any document (page) as the result, the characters are in an orthoscopic state (S169).

When Steps S166—YES and S168 are executed, the same as the fifth exemplary embodiment (first example) is performed. Meanwhile, if Steps S166—NO and S169 are executed, even though designation of "character direction" of the user's setting is erroneous, the characters of each page are reliably in an orthoscopic state. When the user intentionally designates "character directions" so as to be different from "orthoscopic state", the user selects the execution of Steps S166—YES and S168, not Steps S166—NO and S169. Therefore, it may be possible to eliminate a problem that processing is not performed as intended.

<Configuration Based on Electronic Calculator>

Figure 21:
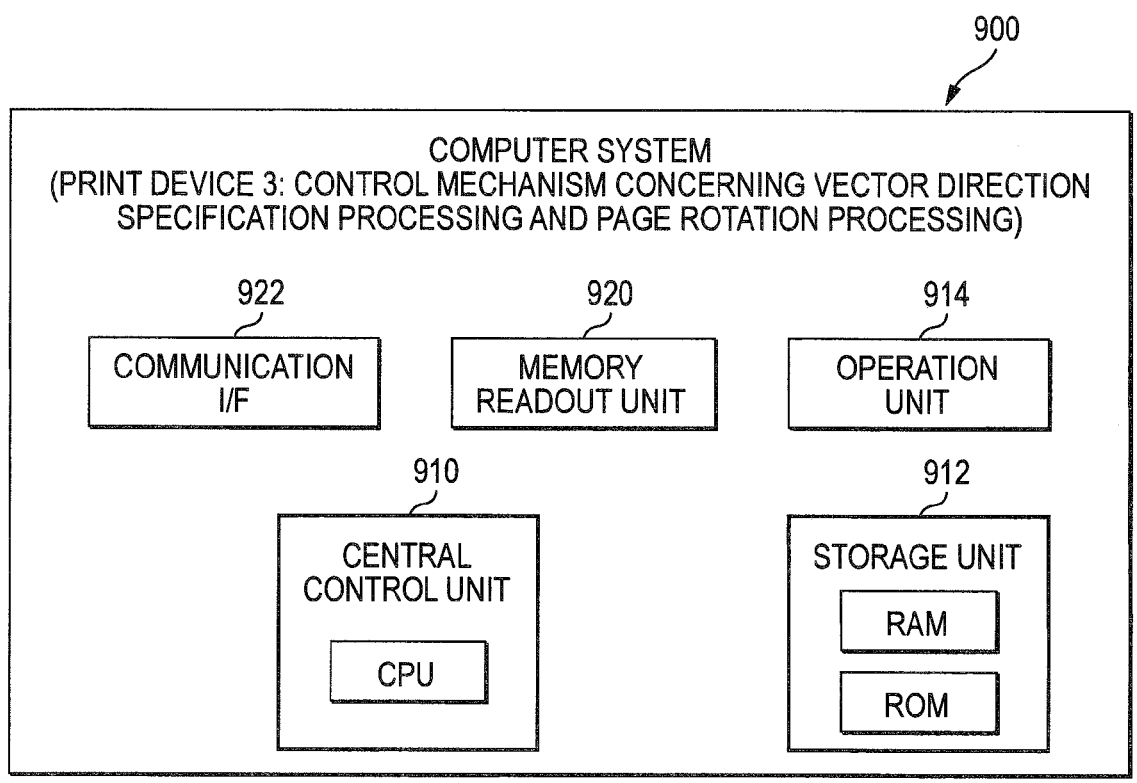
FIG. 21 is a block diagram showing a configuration example when a character output device is configured using an electronic calculator.

FIG. 21 is a block diagram showing another example of the configuration for the vector direction specification processing and the page rotation processing of the print device 3. FIG. 21 shows a more practical hardware configuration of the mechanism for the vector direction specification processing and character rotation control of the print device 3, which is constructed by a microprocessor executing software, using an electronic calculator, such as a personal computer or the like.

That is, in this exemplary embodiment, the structure of the control mechanism of the print device 3 which performs the vector direction specification processing and the page rotation processing is not limited to the configuration based on a hardware processing circuit, but it may be implemented by software using an electronic calculator (computer) based on program codes which realize the functions. Therefore, a program for realizing the structure of this exemplary embodiment by software using an electronic calculator (computer) or a computer-readable storage medium having recorded thereon the program may be extracted as the invention. The structure may be executed by software, making it possible to easily change the processing procedure, without involving in change of hardware.

A series of the vector direction specification processing and the page rotation processing is not limited to software or hardware alone, but may be realized as a combination of software and hardware. When a processing by software is executed, a program that represents a processing procedure is embedded (installed) in a storage medium in a computer by hardware and executed, or a program is embedded in a general-use electronic calculator that can execute various kinds of processing, and executed.

The program for causing the computer to execute the vector direction specification processing function and the page rotation processing function is distributed through the recording medium, such as the CD-ROM or the like. Otherwise, this program may be stored not in the CD-ROM, but in the FD. Further, an MO drive may be provided to store the program in the MO. Further, the program may be stored in other recording mediums, such as a nonvolatile semiconductor memory card including a flash memory, or the like. A program constituting software is not limited to be provided through the recording medium, but may be provided through a wired or wireless communication network or the like. For example, the program may be downloaded and obtained or updated through a network, such as Internet or the like, from other servers. As a file that describes a program code for realizing the vector direction specification processing function and the page rotation processing function, a program is provided. In this case, the program is not limited to a program provided in the form of a collective program file, and may be provided in the form of an individual program module depending on the structure of the hardware of the system formed with the computer.

For example, a computer system 900 has a central control unit 910, a storage unit 912, an operation unit 914, and other peripheral members (not shown).

The central control unit 910 includes a CPU (Central Processing Unit) or a microprocessor. The central control unit 910 is the same as which forms the core of the electronic calculator, represented by the CPU in which arithmetic operations and control performed by the computer are integrated in a micro integrated circuit.

The storage unit 912 includes a ROM (Read Only Memory) which is a storage unit exclusively used for readout, a RAM in which data can be written and from which data can be read out at random, or the like. The ROM stores a control program for the vector direction specification processing function and the page rotation processing function. The operation unit 914 is a user interface for receiving a user's operation.

As the control system of the computer system 900, an external recording medium (not shown), such as a memory card or the like, may be detachably mounted, or may be connected to a communication network, such as Internet or the like. Thus, the control system may include a memory readout unit 920 reading information of a portable recording medium, or a communication I/F 922 serving as a communication interface unit, in addition to the central control unit 910 and the storage unit 912. The memory readout unit 920 enables the program to be installed or updated through the external recording medium. The communication I/F 922 enables the program to be installed or updated through the communication network. The structure of the basic vector direction specification processing and page rotation processing is the same as in the foregoing exemplary embodiments.

While the above description has been made regarding the configuration example where the control mechanism of the print device 3 is realized by software using the computer, as the specific means of the respective units (including functional blocks) of the control mechanism of the print device 3 for realizing the vector direction specification processing and the page rotation processing of this exemplary embodiment, hardware, software, communication means, a combination of them, and other means may be used, which is obvious to those skilled in the art. Multiple functional blocks may be integrated into one functional block. In addition, software for causing the computer to execute the program processing is distributed and installed according to the combination modes.

The invention has been described above using the foregoing exemplary embodiments, but the technical scope of the invention is not limited to the scope described in the foregoing exemplary embodiments. Various alterations or improvements can be added to the exemplary embodiments in a range that does not depart from the gist of the invention, and exemplary embodiments to which those alterations or modifications have been added are also included in the technical scope of the invention.

Further, the foregoing exemplary embodiments are not intended to limit the inventions pertaining to the claims, and it is not the case that all combinations of features described in the foregoing exemplary embodiment are essential to the solving means of the invention. Inventions of various stages are included in the foregoing exemplary embodiments, and various inventions can be extracted by combinations of the plural requirements that are disclosed. As long as effects are obtained even when some requirements are omitted from all of the requirements described in the foregoing exemplary embodiments, configurations from which those requirements have been omitted may be extracted as inventions.

In the foregoing exemplary embodiments, when print data from the host-side device 2 is appended with a character command, the character direction is specified on the basis of the character command, but this is not essentially performed. It may be configuration such that the character direction or rotation/unrotation is determined after the character drawing processing or using the raster image of the copied original document. In this case, a known structure that extracts characters from a raster image and performs character recognition may be used.

In the foregoing exemplary embodiments, description has been made regarding character drawing on the print device 3, but the invention is not limited to this. For example, the structure of each of the exemplary embodiments may be applied to a case where an electronic print document is created and displayed or output, for example, an electronic document of a PDF (Portable Document Format) format is created, or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A character output device comprising:
 a character direction specification unit that specifies a drawing direction of characters for each processing-target region of a processing-target page;
 a character rotation determination unit that determines whether the processing-target page rotates or not based on a relation between the specified drawing direction and a direction of an output medium;
 an output unit that performs an output processing based on the determination by the character rotation determination unit; and
 a character command acquisition unit that acquires a drawing command for the characters,
 the drawing command for the characters acquired by the character command acquisition unit includes a continuous character string, the character direction specification unit: (i) specifies a character direction of a first character in the continuous character string based on the acquired drawing command for the characters, (ii) weights information regarding the specified character direction by multiplying the number of characters in the continuous character string, and (iii) specifies the drawing direction of the continuous character string according to the weighted information regarding the specified character direction.

2. The character output device according to claim 1, wherein the character direction specification unit specifies the drawing direction of the characters for the processing-target region by specifying character directions of the characters on a character coordinate system based on a drawing command for the characters within the processing-target region.

3. The character output device according to claim 1, further comprising:
 a region designation unit that receives designation of the processing-target region.

4. The character output device according to claim 1, further comprising:
 a character direction storage unit that stores information regarding the drawing direction specified by the character direction specification unit in association with the processing-target region,
 wherein the character rotation determination unit determines whether the processing-target page rotates or not based on information regarding the drawing direction read from the character direction storage unit.

5. The character output device according to claim 1, wherein, when information specifying a character direction is appended to an output instruction, the character rotation determination unit determines whether the processing-target page rotates or not according to the attached character direction.

6. The character output device according to claim 1, further comprising:
 a character drawing direction comparison unit that compares another output result based on another determination as to whether the processing-target page rotates or not, and the output result based on the determination by the character rotation determination unit, wherein said another determination is determined according to information specifying a character direction which is appended to an output instruction, and wherein, when the character drawing direction comparison unit determines that the output result and said another output result are different, the character rotation determination unit performs the determination based on an instruction to confirm which output result is used.

7. The character output device according to claim 1, further comprising:

a setting acceptance unit that accepts a setting input by a user regarding the drawing direction of characters, wherein the output unit performs the output processing based on the determination by the character rotation determination unit when the setting acceptance unit does not accept the setting, and the output unit performs the output processing based on the setting when the setting acceptance unit accepts the setting.

8. A character output method comprising:

specifying a drawing direction of characters for each processing-target region of a processing-target page;

determining whether the processing-target page rotates or not based on a relation between the specified drawing direction and a direction of an output medium;

performing an output processing based on the determination; and acquiring a drawing command for the characters, wherein, when the acquired drawing command for the characters includes a continuous character string, the specifying comprises (i) specifying a character direction of a first character in the continuous character string based on the acquired drawing command for the characters, (ii) weighting information regarding the specified character direction by multiplying the number of characters in the continuous character string, and (iii) specifying the drawing direction of the continuous character string according to the weighted information regarding the specified character direction.

9. A non-transitory computer readable medium storing a program causing a computer to execute a process for outputting characters, the process comprising:

specifying a drawing direction of characters for each processing-target region of a processing-target page;

determining whether the processing-target page rotates or not based on a relation between the specified drawing direction and a direction of an output medium;

performing an output processing based on the determination; and acquiring a drawing command for the characters, wherein, when the acquired drawing command for the characters includes a continuous character string, the specifying comprises (i) specifying a character direction of a first character in the continuous character string based on the acquired drawing command for the characters, (ii) weighting information regarding the specified character direction by multiplying the number of characters in the continuous character string, and (iii) specifying the drawing direction of the continuous character string according to the weighted information regarding the specified character direction.

* * * * *